US006113029A

United States Patent [19]

Salinas

[11] Patent Number: 6,113,029

[45] Date of Patent: Sep. 5, 2000

[54] AIRCRAFT CAPABLE OF HOVERING AND CONVENTIONAL FLIGHT

[75] Inventor: Luis A. Salinas, Viña del Mar, Chile

[73] Assignee: ChileCoptors, Inc., Philadelphia, Pa.

[21] Appl. No.: 09/004,665

[22] Filed: Jan. 8, 1998

[51] Int. Cl.[7] .................... B64C 29/00

[52] U.S. Cl. .................... 244/23 C; 244/12.6; 244/23 B; 244/23 D

[58] Field of Search .................... 244/12.2, 12.4, 244/12.5, 12.6, 23 C, 23 B, 23 D

[56] References Cited

U.S. PATENT DOCUMENTS

| | | | |
|---|---|---|---|
| 3,838,835 | 10/1974 | Kling | 244/23 C |
| 4,828,203 | 5/1989 | Clifton et al. | 244/12.3 |
| 5,039,031 | 8/1991 | Valverde | 244/12.2 |
| 5,203,521 | 4/1993 | Day | 244/12.2 |

*Primary Examiner*—Jacques H. Louis-Jacques
*Assistant Examiner*—Yonel Beaulieu
*Attorney, Agent, or Firm*—Gary M. Cohen

[57] ABSTRACT

Vertical lift in an aircraft is produced by driving a column of air downwardly, through an annular thrust-flow channel which is formed in the body (fuselage) of the aircraft. The aircraft also has an aerodynamic shape which is capable of developing lift responsive to forward flight. The annular thrust-flow channel is provided with a flow control mechanism which is capable of directing the developed air flow in varying orientations between a substantially vertical (axial) orientation for developing stationary, vertical lift (i.e., hovering) and a vectored (angled) orientation for developing a vertical component for producing lift and a horizontal component for producing forward (or rearward) flight, or flight to either side.

58 Claims, 15 Drawing Sheets

AIRCRAFT CAPABLE OF HOVERING AND CONVENTIONAL FLIGHT

BACKGROUND OF THE INVENTION

The present invention generally relates to an aircraft having the hovering characteristics of a helicopter, yet which is equally capable of conventional forward flight. The aircraft is capable of providing such operation while also providing enhanced maneuverability, controllability, performance and efficiency.

As is well known, conventional helicopters include a rotor assembly which operates to develop lift by driving a column of air downwardly, through a defined rotor plane. Propulsion is achieved by tilting the shaft of the rotor assembly in the desired direction. Moments for maneuvering are produced by tilting the rotor plane relative to the shaft. To prevent the helicopter from spinning or precessing about its main rotor axis, a tail rotor assembly is generally provided. Alternatives for preventing such spinning or precessing include the use of tandem rotors, side-by-side rotors and coaxial counter-rotating rotors.

In practice, the air flow developed through the rotor plane tends to be fairly turbulent, particularly immediately below the rotor plane. This tends to complicate control of the aircraft, contributing to sluggish controllability which places relatively heavy mechanical and dynamic loads on the rotor mechanism, particularly the rotor head, rotor shaft and swash plate system. As a result, a fine control of helicopter flight is not easily achieved. Moreover, maximum velocities in forward flight are usually kept modest due to the intrinsic limitations of helicopter propulsion.

It has therefore remained desirable to develop an aircraft having the ability to hover, yet which is not subject to the aerodynamic limitations presented by the rotor assembly of conventional helicopter designs.

SUMMARY OF THE INVENTION

It is therefore the primary object of the present invention to provide an aircraft which is equally capable of sustained hovering flight as well as full forward flight.

It is also the object of the present invention to provide an aircraft which is capable of sustained hovering and full forward flight, and which further exhibits enhanced maneuverability, controllability, performance and efficiency.

It is also the object of the present invention to provide an aircraft which is capable of sustained hovering and full forward flight, and which is capable of carrying a useful load.

It is also the object of the present invention to provide an aircraft which is capable of sustained hovering and full forward flight, and which is serviceable and cost efficient.

These and other objects which will become apparent are achieved through the recognition of novel principles pertaining to the geometry and the basic mechanisms used to achieve hovering flight. In particular, this pertains to the manner in which the aircraft achieves vertical lift. To this end, the aircraft of the present invention employs an annular thrust-flow channel to achieve lift, as distinguished from the rotary wing theories which are used to operate conventional helicopters and the like.

In accordance with the present invention, vertical lift is achieved by driving a column of air downwardly, through an annular thrust-flow channel which is formed in the body (fuselage) of the aircraft. The aircraft is further provided with an aerodynamic shape which is capable of developing lift responsive to forward flight (i.e., a "lift body"). The annular thrust-flow channel is provided with a flow control mechanism which is capable of directing the developed air flow in varying orientations between a substantially vertical (axial) orientation for developing stationary, vertical lift (i.e., hovering) and a vectored (angled) orientation for developing a vertical component for producing lift and a horizontal component for producing forward (or possibly rearward) flight, or flight to either side.

For a further discussion of the improvements of the present invention, reference is made to the detailed description which is provided below, taken in conjunction with the following illustrations.

DETAILED DESCRIPTION OF THE PREFERRED EMBODIMENTS

Figure 1:
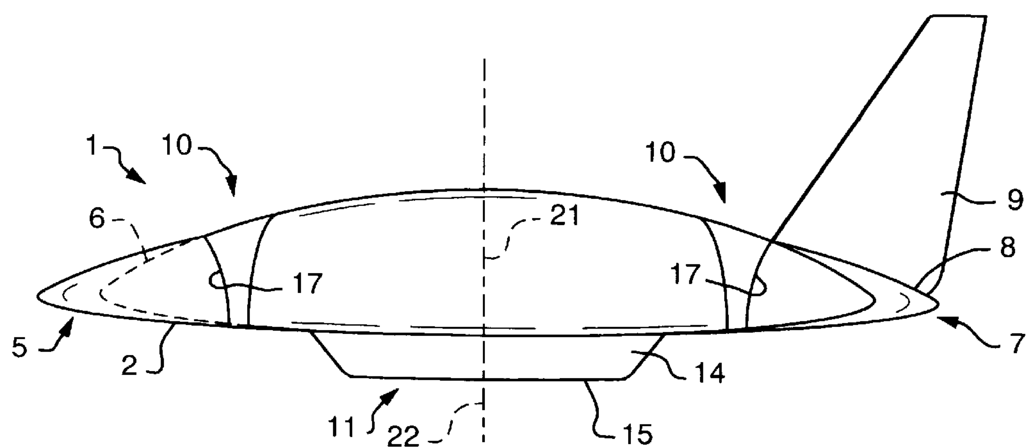
FIG. 1 is a side elevational view of an example of an aircraft produced in accordance with the present invention.
Figure 2:
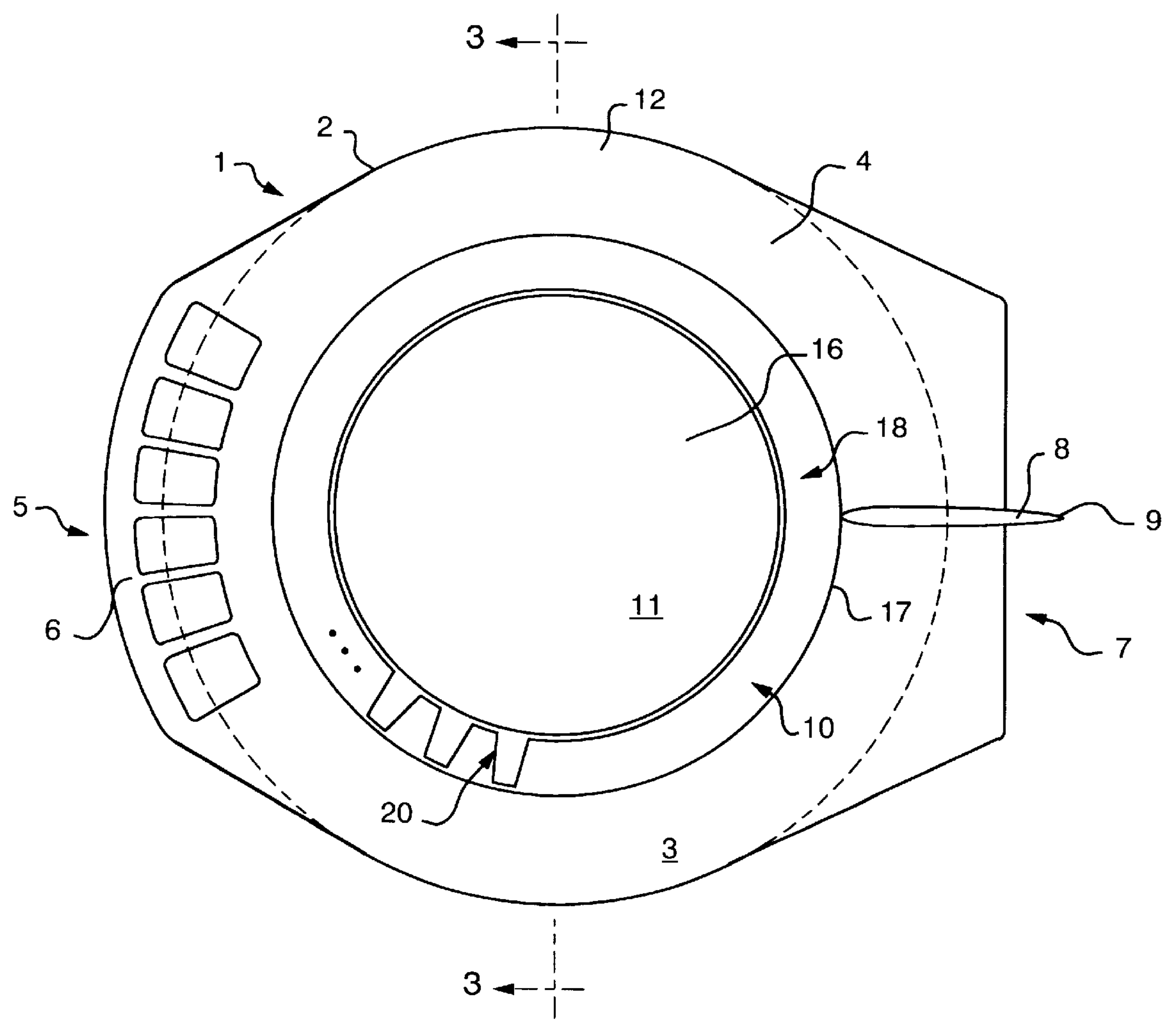
FIG. 2 is a top plan view of the aircraft of FIG. 1.

FIGS. 1 and 2 show an example of an aircraft 1 which is produced in accordance with the present invention. The aircraft 1, which is more or less circular in shape as viewed from the top, and which is generally spheroidal in overall geometry and topology, is presented primarily for purposes of illustration. It should be understood that any of a number of different aircraft configurations may be developed which incorporate the improvements of the present invention, some of which will be discussed more fully below. Irrespective of the overall configuration selected for use in accordance with the present invention, the aircraft (i.e., the aircraft 1) is generally comprised of the following operative components.

The aircraft 1 includes a fuselage 2 which provides interior space 3 for carrying a payload (including cargo and/or passengers) and which is defined by an exterior covering 4 for developing an aerodynamic shape of desired configuration. As is preferred in accordance with the present invention, the configuration selected for the exterior covering 4 of the aircraft 1 of FIGS. 1 and 2 operates to provide the aircraft 1 with "lift" responsive to forward movement of the aircraft (i.e., responsive to "thrust"), the development of which will be discussed more fully below. Such "lift bodies" are themselves known in the industry, and eliminate the need for the aircraft 1 to employ wings for purposes of developing the appropriate lift (although the aircraft of the present invention can also be provided with wing structures if desired for a particular application).

The fuselage 2 has a forward end 5 which includes a cabin 6 for housing a pilot/crew and the instrumentation which is conventionally provided for operating an aircraft. The cabin 6 is provided in portions of the forward end 5 (front, upper or lower sections) which are selected to ensure proper visibility for the application for which the aircraft has been developed (e.g., forward flight including cargo/passenger applications, hovering flight including lifting, search and rescue, etc.).

The fuselage 2 also has a rearward end 7 which includes a tail section 8 for use in establishing control of the aircraft. Such control conventionally includes the maintenance of forward flight (anti-spinning) and steering of the aircraft. A rudder 9 is conventionally provided for such purposes. The fuselage 2 can also be provided with an elevator and ailerons, for purposes of directing the aircraft upwardly or downwardly and for tilting the aircraft, as is conventional. However, as will become apparent from the description which follows, such structural elements are not required in accordance with the present invention since operative elements of the aircraft 1 can substitute for such control elements.

Central portions of the fuselage 2 incorporate structure for developing an annular thrust-flow channel 10. The annular thrust-flow channel 10 operates to divide the aircraft 1 into two main structures including a central payload compartment 11 and a peripheral payload compartment 12. The central payload compartment 11 and the peripheral payload compartment 12 are connected to each other, and are maintained in a spaced relation to each other, by a series of radial beams 13. The radial beams 13 operate to complete the resulting structure and define the annular thrust-flow channel 10.

Figure 3:
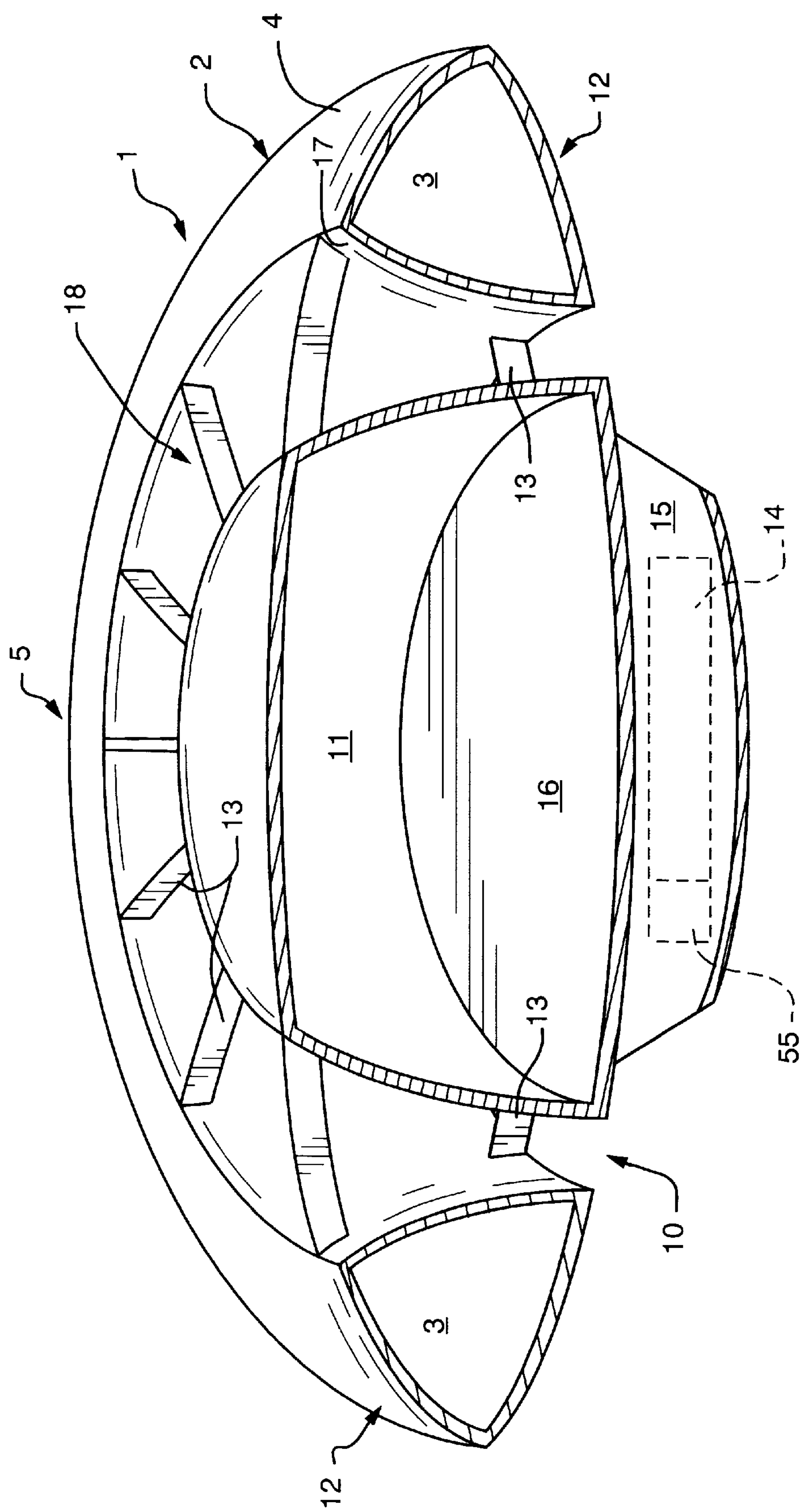
FIG. 3 is a perspective view of a section of the aircraft of FIG. 2, taken along the line 3—3.

As is best illustrated in FIG. 3 (showing a midplane cross-section corresponding to the plane subtended by the roll axis and the yaw axis of the aircraft), the central payload compartment 11 is generally cylindrical in structure, having a height which is on the order of from one-half to the same order of magnitude as its diameter. The central payload compartment 11 serves to accommodate a power plant 14 (i.e., engines) in its bottom part 15 and to carry a desired payload in its upper part 16.

The peripheral payload compartment 12 is more or less toroidal in shape, and surrounds the cylindrical central payload compartment 11. As previously indicated, the peripheral payload compartment 12 serves to accommodate the flight cabin 6 at the forward end 6, and the tail section 8 at the rear end 7. The peripheral payload compartment 12 further defines the interior space 3, as previously described, which can serve to receive an additional payload, passengers and/or special (optional) systems and devices, as is desired. The central payload compartment 11 and the peripheral payload compartment 12 are preferably co-planar (horizontally), and share a common vertical axis which coincides with the principal axis of the aircraft 1, as will be discussed more fully below.

Loads must be distributed in both the central payload compartment 11 and the peripheral payload compartment 12 in such a way that the center of gravity of the loaded aircraft 1 will be caused to lie more or less on the principal (vertical) axis of symmetry, toward the bottom of the aircraft 1. For this reason, the power plant 14, which is one of the heavier components of the aircraft 1, is preferably located in the bottom part 15 of the central payload compartment 11 to help keep the center of gravity of the aircraft 1 close to its yaw (or principal) axis.

The mean outer diameter of the central payload compartment 11 is less than the mean inner diameter of the annular casing 17 of the peripheral payload compartment 12 which surrounds it, leaving a ring-shaped space 18 between the two structures. The ring-shaped space 18 constitutes the annular thrust-flow channel 10 previously referred to, which serves to develop the air flow which will produce lift for the aircraft 1. The walls of the resulting aerodynamic channel combine to define a space for receiving a rotor system 20 capable of producing this air flow, as will be discussed more fully below.

The annular thrust-flow channel 10 has a central axis 21 (main symmetry) which coincides with the central axis 22 (main symmetry) of the aircraft 1. This will hereafter be referred to as the "principal axis of symmetry" of the aircraft 1. This axis further coincides with the yaw axis of the aircraft 1. In practice, the center of gravity of the aircraft 1 must Lie on, or close to the principal axis of symmetry. In the discussion which follows, and for purposes of description only, it shall be assumed that these axes, including the yaw axis, are each vertically oriented.

The central axis of symmetry 22 of the cylindrical structure forming the overall aircraft 1, which is perpendicular to the plane defined by the fuselage 2, coincides with the principal axis of symmetry of the aircraft 1. A column of air is caused to be directed through the annular thrust-flow channel 10, along this principal axis of symmetry, to provide lift for the aircraft 1.

In accordance with the present invention, this column of air is impelled along the principal axis of symmetry through the action of a system of counter-rotating, paired blade wheel systems which are caused to rotate within the annular thrust-flow channel 10. This system of counter-rotating blade wheels is driven by the power plant 14 provided in the central payload compartment 11 (comprised of one or more turbo-engines of sufficient power) through a system of shafts and gears, which will be further described below.

Forward flight is initially obtained by deflecting the air column discharged from the annular thrust-flow channel 10 in the appropriate direction. In this way, the column of air discharged from the annular thrust-flow channel 10 can be used to operate the aircraft 1 in desired modes from stationary hovering to forward flight. When the forward speed attained by the aircraft 1 in forward flight achieves a threshold value, which will depend on the specific aerodynamic design of the fuselage 2 of the aircraft 1, the lifting action provided by the rotor system 20 is no longer necessary, and further rotation of the counter-rotating, paired blade wheel systems can be discontinued if desired. In such case, forward thrust for the aircraft 1 is provided entirely by its turbo-engines, and in this mode the aircraft 1 performs much like a conventional aircraft (i.e., a flying wing), responsive to lifting forces which are produced aerodynamically, by the airfoil shape of the fuselage 2.

Thus, the lifting system of the present invention operates much like a multistage, axial blower or fan having a relatively large volume and a relatively low compression ratio, and not on the basis of conventional rotary wing theory, as withknown hovering aircraft (helicopters). However, for convenience in the calculation of performance, conventional rotary wing theory can be used to provide rough approximations for the thrust, power, loading, and other capabilities of the aircraft 1 of the present invention. In all modes of operation, the air flow developed through and around the annular thrust-flow channel 10 and the fuselage 2 is optimized, especially for hovering and forward flight.

The area (annular) along the cross-section of the annular (aerodynamic) channel 18 is preferably larger at its upper end and smaller at its lower end (i.e., downwash). This is done to increase the speed of the air flowing through the channel 18 responsive to operations of the rotor system 20, while achieving flow conditions which are more or less constant in pressure. To this end, the rotor system 20 is located in the annular aerodynamic channel 18 so that air is forced to flow through the channel 18, while increasing the air velocity in such a way that the resulting changes in momentum of the air mass can provide the necessary lift (or upward thrust) for the aircraft 1. While hovering, the resulting air flow is roughly perpendicular to the plane of the assembly formed by the fuselage 2 and the central payload compartment 11, and accordingly, roughly parallel to the yaw axis (or the principal axis of symmetry).

As previously indicated, the central payload compartment 11 and the peripheral payload compartment 12 are joined together by a system of radial beams 13. In order to avoid unnecessary turbulence, and thereby reduce aerodynamic friction to a minimum, the radial beams 13 are preferably provided with an airfoil-shaped cross-section so that the air flow through the ring-shaped space 18 is kept uniform (i.e., laminar).

The cross-section of the aircraft 1 parallel to the mid-plane formed by the roll axis and the yaw axis will have airfoil shapes of varying chord, aspect ratio, camber, etc., to meet the design requirements for a particular application. The side walls establishing the ring-shaped space 18 can have a configuration which varies from straight shapes of varying slope to curved shapes of varying curvature, developing a narrowing venturi of an appropriate compression ratio. A ratio on the order of 2:1 is shown in the illustrative embodiment of FIG. 4B. However, it is expected that other ratios will be found to be useful for this and other applications of the improvements of the present invention. As an example, ratios on the order 3:1 to 4:1 may be preferable for some higher speed applications.

Figure 8:
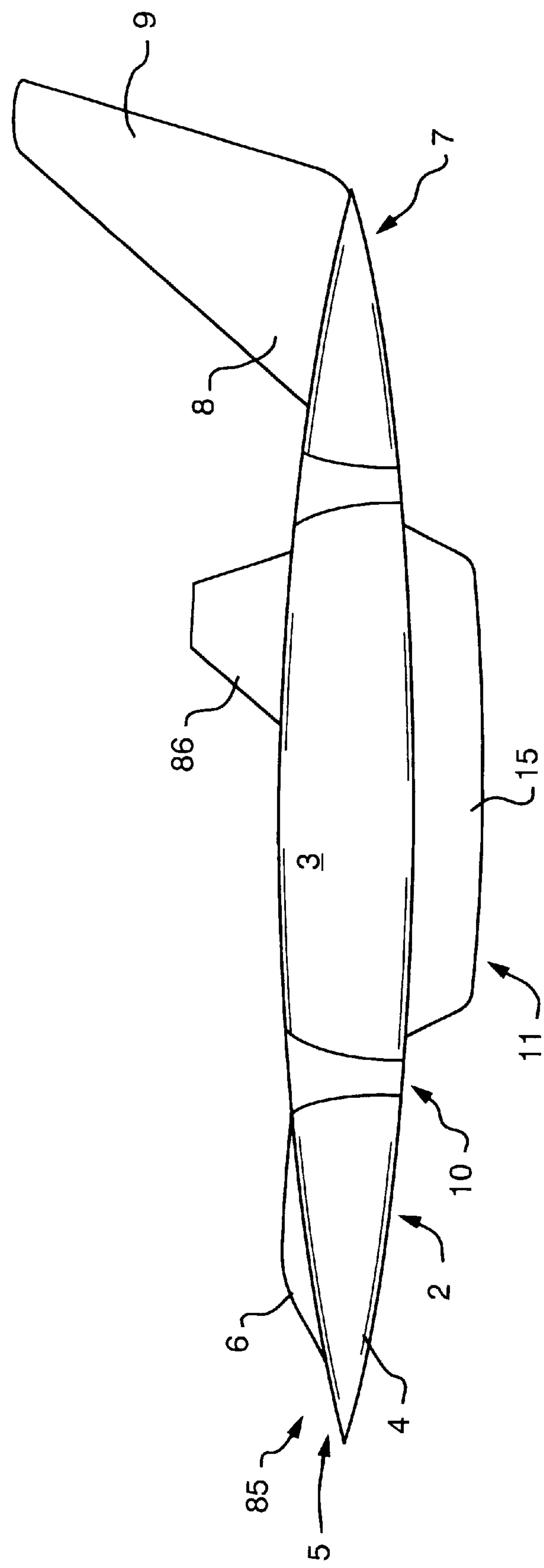
FIG. 8 is a side elevational view of a first alternative embodiment aircraft produced in accordance with the present invention.
Figure 9:
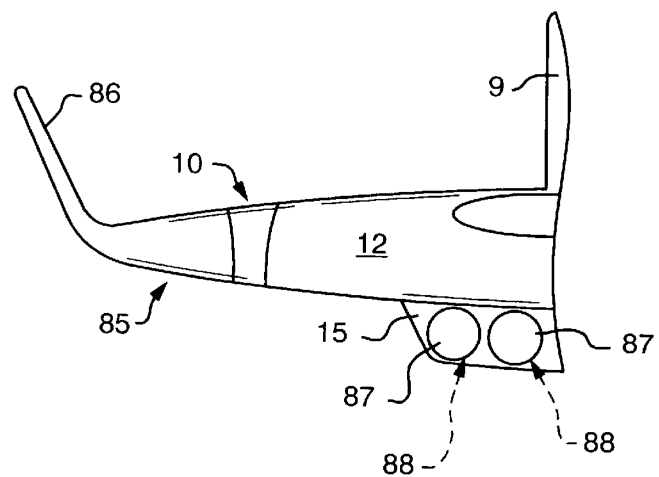
FIG. 9 is a partial, rear elevational view of the aircraft of FIG. 8.
Figure 10:
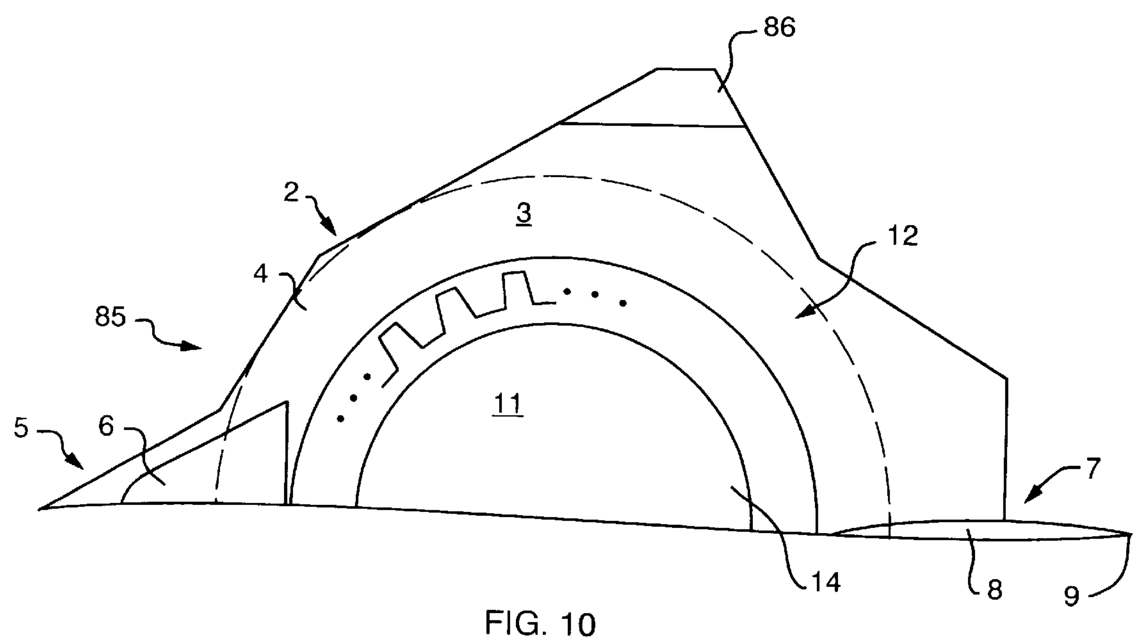
FIG. 10 is a partial, top plan view of the aircraft of FIG. 8.

The exterior shape of the aircraft 1 will generally depend on the purpose the aircraft is to serve. In particular, the geometry of the aircraft will depend on basic requirements such as size, payload, range, maneuverability, robustness, reliability, maximum flight speed, expected maximum accelerations, etc. For example, the aircraft shown in FIGS. 1 and 2 is intended for general purpose use (transport/cargo). The aircraft shown in FIGS. 8 to 10 is intended for uses calling for higher speeds, accelerations and aerodynamic loading (e.g., a fighter plane).

Figure 4A:
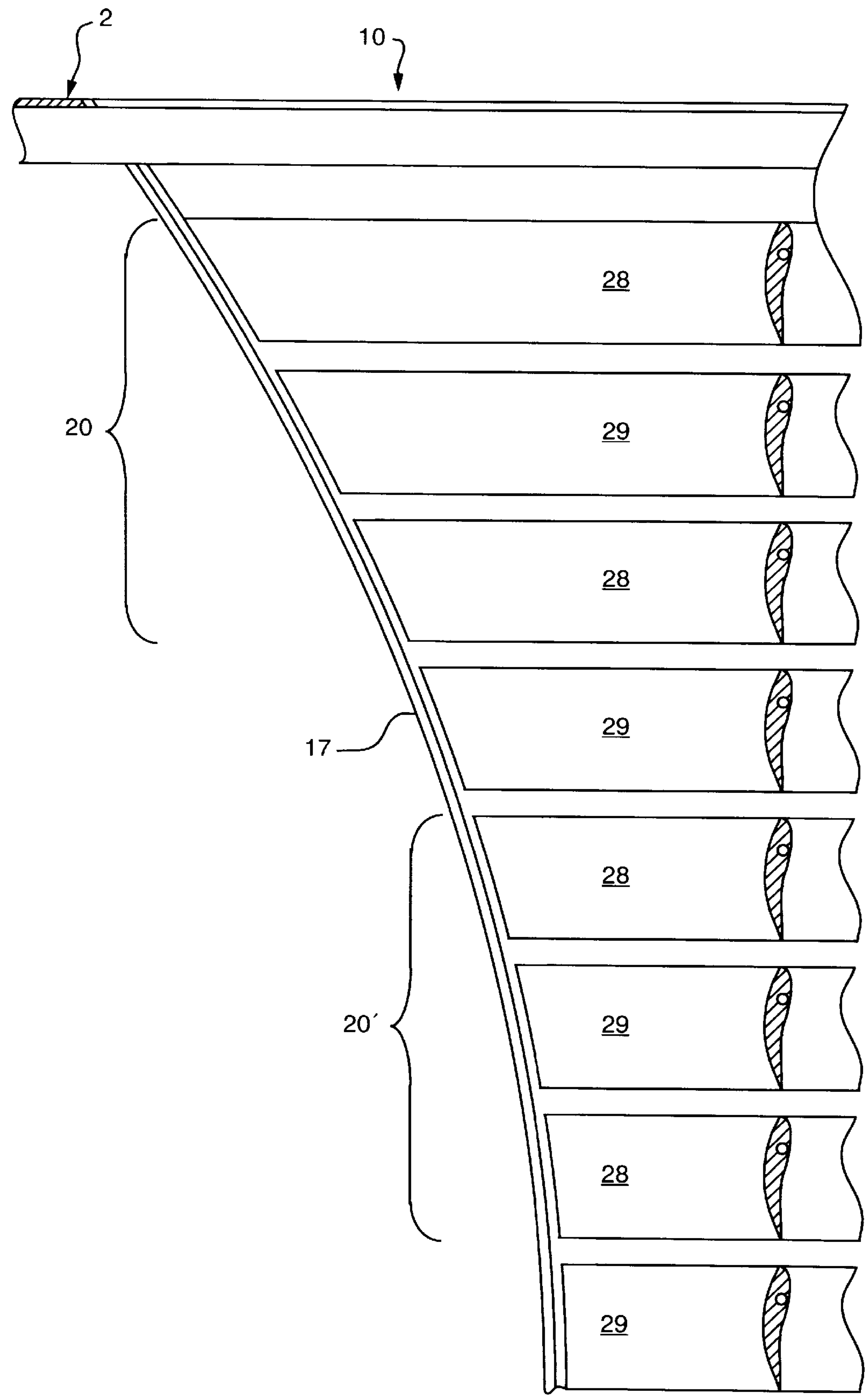
FIG. 4A is a partial, sectional view of the annular thrust-flow channel shown in FIG. 3, illustrating the interface between the annular casing of the fuselage and the blades.
Figure 4B:
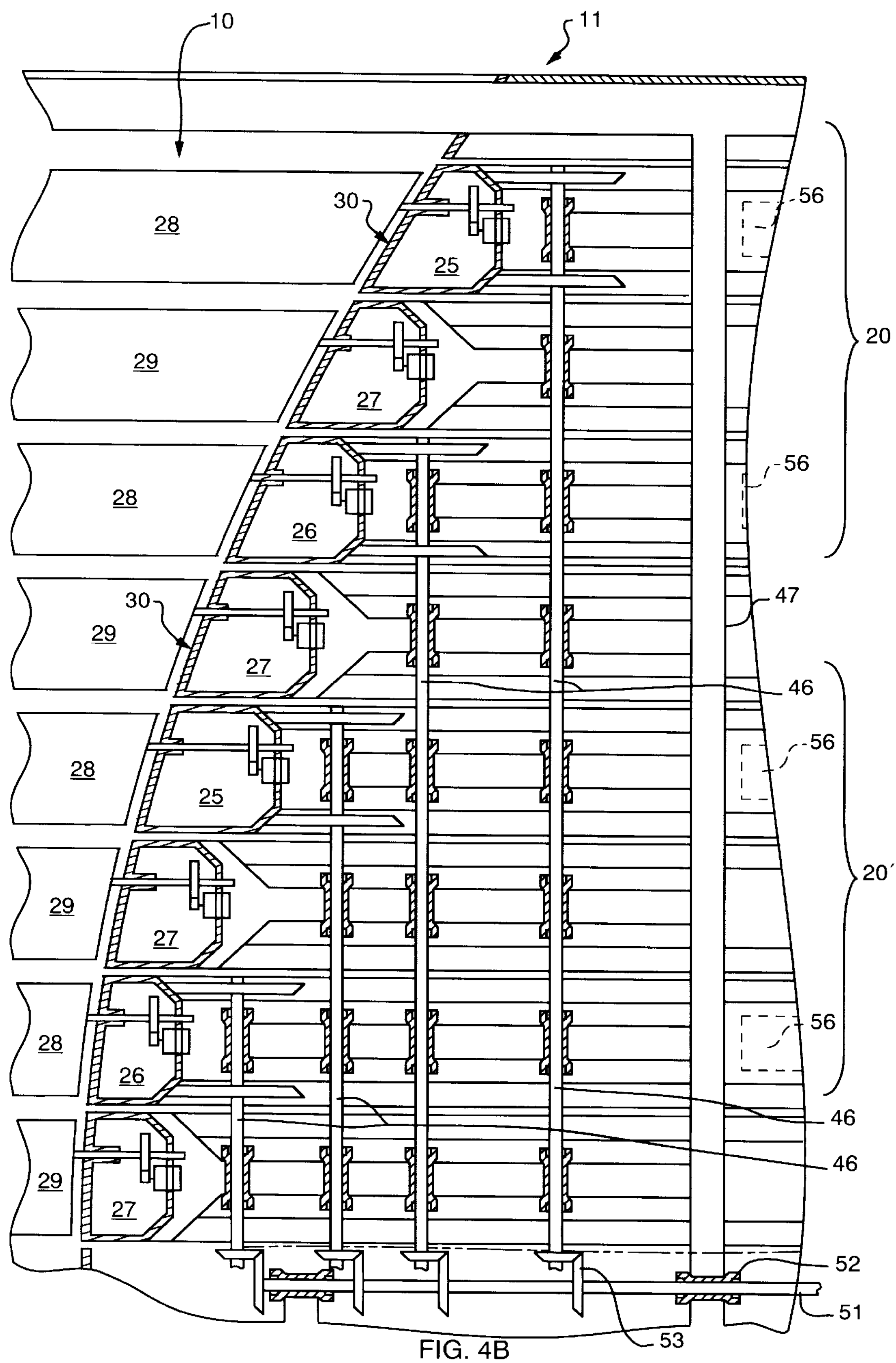
FIG. 4B is a partial, sectional view of the annular thrust-flow channel shown in FIG. 3, illustrating the interface between the blades and the central compartment.

FIGS. 4A and 4B show the operative elements of the rotor system 20 in greater detail. As previously mentioned, conventional helicopter designs obtain upward lift by driving a column of air downwardly through a rotor plane. However, it is also well known that in conventional helicopter designs, loading on the rotor blades increases from the rotor shaft toward the tip. As a result, only the outermost portions of a conventional rotor blade are responsible for the major portion of the amount of lift which is developed. In accordance with the present invention, this phenomenon is advantageously employed by using only the outermost portions of a rotor blade (primarily, the outermost one-half, and typically, no more than the outermost one-third or one-quarter of the blade) for purposes of developing lift. It is then only necessary to rotate these peripheral blade portions within the annular thrust-flow channel 10, leading to a significant improvement in efficiency.

To this end, upward thrust is produced by driving a column of air downwardly through the annular thrust-flow channel 10 using a rotor system 20 which is comprised of an even number of counter-rotating blade wheels 25, 26, which act as impellers for moving the air mass through the ring-shaped space 18. While one rotor system 20 including a single pair of counter-rotating blade wheels 25, 26 may be sufficient to meet certain light-duty applications, most applications will benefit from the use of plural rotor systems 20, 20', . . . , 20$^n$, each of which includes a pair of counter-rotating blade wheels 25, 26. In each case, any two consecutive counter-rotating blade wheels are separated by a stationary vane wheel 27. The stationary vane wheels 27 also operate to radially join the central payload compartment 11 and the peripheral payload compartment 12, contributing to the rigidity of the assembled structure, in addition to contributing to maintaining the air flow through the annular thrust-flow channel 10 as smooth as possible.

Each of the wheels 25, 26, 27 (rotary or stationary) includes a series of blades 28 or vanes 29 (depending upon type) mounted on an annular rim 30 which defines a hollow region having approximately the same mean diameter as the outer diameter of the central payload compartment 11 (in this way completing the peripheral shape of the central payload compartment 11). This assists in providing uniform sides (in the central payload compartment 11 and the annular casing 17), for defining a uniform annular thrust-flow channel 10. The counter-rotating blade wheels 25, 26 rotate within the ring-shaped space 18 formed between the central payload compartment 11 and the annular casing 17 to develop an axial, downward air flow for producing an upward lift (much the same as a multistage, axial blower, fan or compressor having a relatively large volume and a relatively low compression ratio).

For improved control of the air flow which is developed through the annular thrust-flow channel 10, both the blades

28 of the counter-rotating blade wheels 25, 26 and the vanes 29 of the stationary vane wheels 27 are preferably made adjustable in pitch using an appropriate control mechanism. One such control mechanism 35 is best shown with reference to FIG. 5 of the drawings. The control mechanism 35 includes a servo-motor 36 mounted to the inner wall 34 of each blade wheel 25, 26, or vane wheel 27. The servo-motor 36 is coupled with a shaft 37 for altering the angle of the blade or vane associated with the shaft 37. The servo-motor 36 and the shaft 37 are preferably coupled by a system of reducing gears 38, 39 for assisting in rotating the shaft 37 through a desired and controlled angle, in turn controlling the pitch of the associated blade or vane. This provides for full and accurate control of the air flow through the annular thrust-flow channel 10, which is not possible for conventional helicopter designs.

The height of the blades/vanes associated with the annular wheels 25, 26, 27 preferably decreases from the top of the annular thrust-flow channel 10 to its bottom, in proportion to the geometry of the channel 10 (i.e., the narrowing of the ring-shaped space 18). Each of the correspondingly paired, counter-rotating blade wheels 25, 26 are configured so that their inertial and dynamic moments cancel each other, in this way preventing undesired spinning or precession of the aircraft 1 responsive to operation of the rotor system 20.

Figure 5:
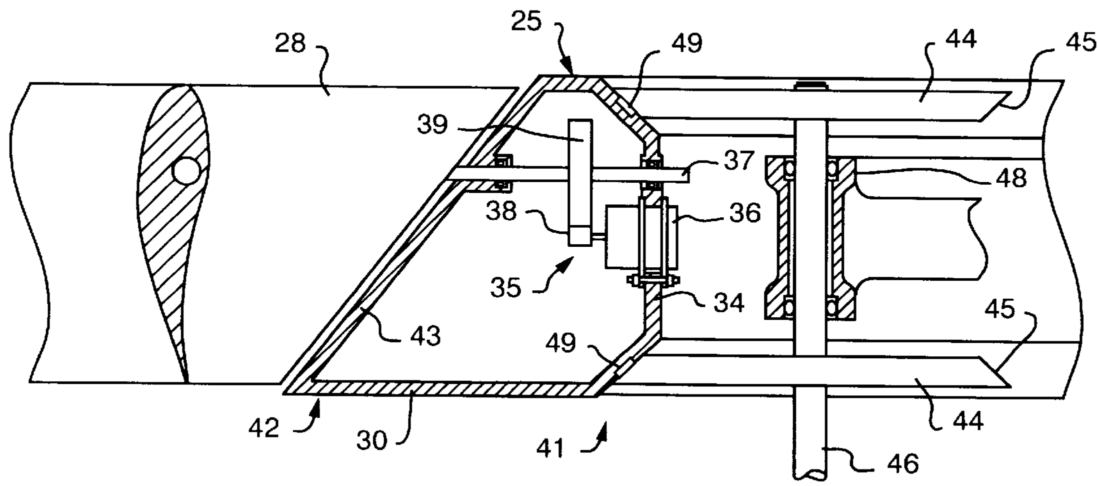
FIG. 5 is an enlarged sectional view of one of the blade/drive interfaces of the rotor system.

As previously indicated, the blade wheels 25, 26 and the vane wheels 27 are co-axial with the main axis of the annular thrust-flow channel 10, and accordingly, with the principal axis of the aircraft 1. To this end, each of the wheels 25, 26, 27 is preferably formed as a hollow rim 30 having a cross-section which is best shown in FIG. 5. The annular rim 30 of each wheel 25, 26, 27 is coaxial with the main axis of the central payload compartment 11.

As is best shown in FIG. 4B, the configuration of the innermost portions 41 of the several rims 30 is substantially constant, progressing along the annular thrust-flow channel 10, while the configuration of the outermost portions 42 of the several rims 30 (especially the slope of the peripheral face 43 of each rim 30) varies along the annular thrust-flow channel 10. The outermost portions 42 of the series of rims 30 are varied in configuration (slope and width) in order to provide the annular thrust-flow channel 10 with an inside face which is substantially smooth and uniform, for purposes of optimizing air flow through the channel 10, and to properly mate the rims 30 with the cooperating structures of the central payload compartment 11 which will be described more fully below.

Each of the blade wheels 25, 26 is supported in position by a series of paired bearing wheels 44. The bearing wheels 44 are oriented on an axis which is substantially parallel to the principal axis of the central payload compartment 11, and are preferably distributed uniformly (symmetrically) about the periphery of the central payload compartment 11, for snugly engaging the inner portions of each blade wheel 25, 26, and for supporting each of the blade wheels 25, 26 in proper position. In this way, the bearing wheels 44 serve as load bearing wheels for receiving the blade wheels 25, 26, while allowing the blade wheels 25, 26 to freely rotate about the central axis of the central payload compartment 11.

To this end, the bearing wheels 44 have a beveled face 45 which is formed at a slope matched to the innermost portions 41 of the rims 30 engaged by the bearing wheels 44. The beveled faces 45 of the bearing wheels 44 are caused to press tightly against the innermost portions 41 of the rims 30, serving to support the series of rims 30 in their desired position. The beveled faces 45 of the paired bearing wheels 44 cooperate with the innermost portions 41 of the blade wheels 25, 26 to prevent the blade wheels 25, 26 from moving either axially or radially, while at the same time allowing for their free rotation about the central axis of the central payload compartment 11. In this way, the blade wheels 25, 26 are permitted to rotate precisely in their desired position.

The paired bearing wheels 44 are received upon a series of drive shafts 46, which are in turn received within a support structure 47. The drive shafts 46 are preferably received within the support structure 47 by plural bearings 48, for optimizing the structural integrity of the resulting assembly (particularly for the drive shafts 46 of greater length). The resulting assembly also assists in ensuring good electrical contact between the several elements of the support system, which is particularly important for establishing control of these various elements (e.g., for blade pitch control), as follows.

The bearing wheels 44 are preferably made of a light, but strong and electrically conductive alloy material. The upper and the lower bearing wheels 44 of each blade wheel pair are preferably kept electrically isolated from each other and, by conventional means, are respectively connected to an appropriate control-voltage source for use in regulating blade pitch. To this end, a conductor ring 49 is embedded in the beveled face 45 of the upper and the lower blade wheels 44 so that the conductor rings 49 are maintained in electrical contact with the engaged rim 30. These (paired) conductor rings 49 are then used for purposes of electrically communicating with the corresponding servo-motor 36 associated with each of the rims 30. Each of the servo-motors 36 can then operate, through the paired gears 38, 39, to rotate the shaft 37 which receives the blade 28 associated with a particular blade wheel. Controlled rotation of the several shafts 37, responsive to operations of the servo-motors 36, permits adjustment of the pitch of the series of blades 28 associated with the blade wheels 25, 26.

It is anticipated that the blade wheels 25, 26 will operate at rotational speeds on the order of 24,000 r.p.m. (i.e., 400 rotations per second), which is on the same order of magnitude as the rotational speeds produced with current aircraft turbines. Since the mean linear speed of the blades 28 associated with the rotating blade wheels 25, 26 will in many cases be only slightly (a few percent) below the speed of sound (i.e., 300 meters per second), the diameter of the bearing wheels (the rims 30) should be kept to approximately 0.24 meters. In this way, the mechanical speeds and loads which are developed can be kept well within the range of what can reasonably be achieved with current, conventional technology.

Each of the vane wheels 27 is supported in its desired position through a direct connection between the rim 30 of the vane wheel 27 and fixed portions of the support structure 47. The vane wheels 27 are each oriented on an axis which coincides with the central axis of the blade wheels 25, 26, and which is substantially parallel with the principal axis of the central payload compartment 11. A servo-motor 36 is associated with each of the rims 30 of the stationary vane wheels 27 so that the servo-motors 36 can operate, through the paired gears 38, 39, to rotate the shafts 37 which receive the vanes 29 associated with the vane wheels 27. In this way, controlled rotation of the several shafts 37, responsive to operations of the servo-motors 36, permits adjustment of the pitch of the several vanes 29 associated with the vane wheels 27. In operation, controlled rotations of the vanes 29 associated with the vane wheels 27 will be appropriately matched with controlled rotations of the blades 28 associated with the blade wheels 25, 26 to optimize the flow (thrust) which is developed through the annular thrust-flow channel 10.

Power is transmitted to the rotor system 20 from the power plant 14 (e.g., one or more conventional aircraft turbines) associated with the central payload compartment 11 (preferably provided in its bottom part 15, as previously described). The output of the power plant 14 is appropriately coupled (through a flexible or a rigid coupling, as preferred) to a common drive shaft 51 which preferably extends diametrically along and through the support structure 47 (in the illustrative embodiment shown, along its lowermost portions). The location of the drive shaft 51 can be varied, as desired, to effectively mate the rotor system 20 with the power plant 14 which has been selected for use. A series of bearings 52 associated with the support structure 47 are used to support the drive shaft 51 in its desired position, for rotation responsive to the power plant 14.

The drive shaft 51 includes a series of drive gears (such as the beveled gears 53) for engaging each of the drive shafts 46 associated with the support structure 47, in turn causing desired rotations of the several blade wheels 25, 26. As previously indicated, each of the blade wheels 25 is caused to rotate in a direction counter to the direction of rotation of the corresponding blade wheel 26 of the resulting pair (to prevent the aircraft 1 from spinning or precessing about the central axis 22). Such rotation is established by properly positioning the beveled gears 53 associated with each of the respective drive shafts 46 (i.e., on the proper side of the drive shaft).

As an alternative to this mechanical drive system, the series of blade wheels 25, 26 may also be rotated responsive to a magnetic drive system, if desired. In this configuration, the power plant 14 is coupled with an electric generator 55 (shown in phantom in FIG. 3), which is preferably located in the bottom part 15 of the central payload compartment 11. The generator 55 communicates with one or more electromagnetic linear motors 56 (shown in phantom in FIG. 4B) having stators which are preferably symmetrically positioned around the periphery of the central payload compartment 11. The corresponding electric rotors (associated with each of the linear motors 56) are mounted to the rims 30 of t h e several blade wheels 25, 26. When electric power is applied to the stators, the rotors, and accordingly, the blade wheels 25, 26, are cause d to rotate (again, in their desired directions of counter-rotation).

Irrespective of the specific drive system selected for use in accordance with the present invention, a flow of air is caused to enter and pass through the annular thrust-flow channel 10, for purposes of producing lift in the aircraft 1. This air flow is then controlled with a louver system 60 which is capable of regulating the resulting flow to provide the aircraft 1 with suitable operational controls (i.e., lift, direction, etc.).

Figure 6A:
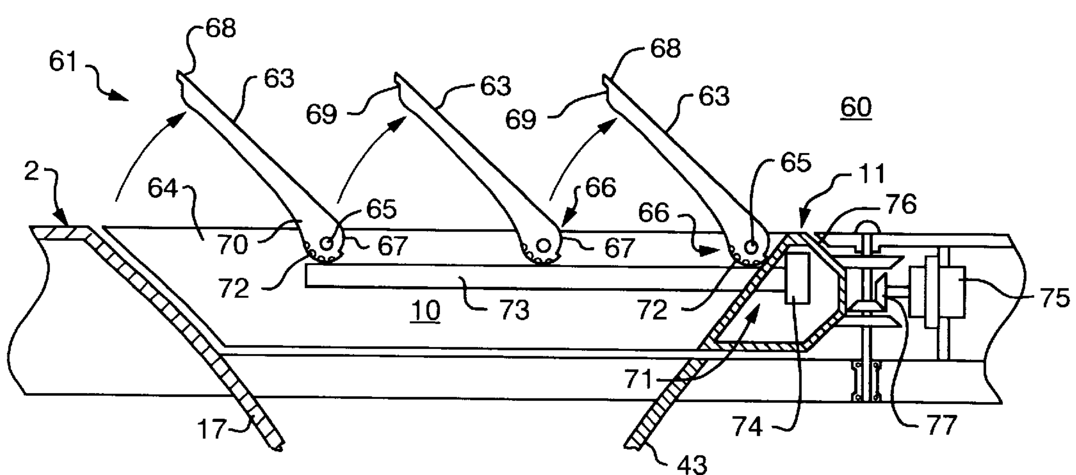
FIG. 6A is a cross-sectional view of the upper louver assembly of the annular thrust-flow channel, in an opened position.
Figure 6B:
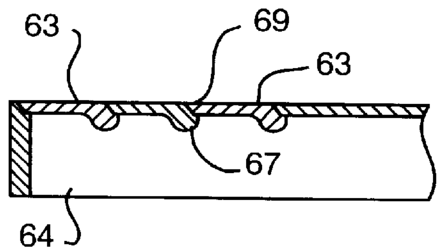
FIG. 6B is a cross-sectional view of the upper louver assembly in a closed position.

The louver system 60 includes an upper louver assembly 61 ( shown in FIG. 6A, 6B and 6C) and a lower louver assembly 62 (shown n FIGS. 7A and 7B) which are capable of opening and closing responsive to pilot control. When opened (FIGS. 6A and 7A), the upper louver assembly 61 and the lower louver assembly 62 combine to direct the developed air flow through and from the annular thrust-flow channel 10, for purposes of directing movements of the aircraft 1. When closed (FIGS. 6B and 7B), both the upper louver assembly 61 and the lower louver assembly 62 preferably assume positions which are capable of providing the aircraft 1 with an upper surface and a lower surface that is substantially smooth in configuration. The smooth upper and lower surfaces of the aircraft 1 then cooperate to form an airfoil design capable of behaving aerodynamically responsive to forward movement of the aircraft 1.

Figure 6C:
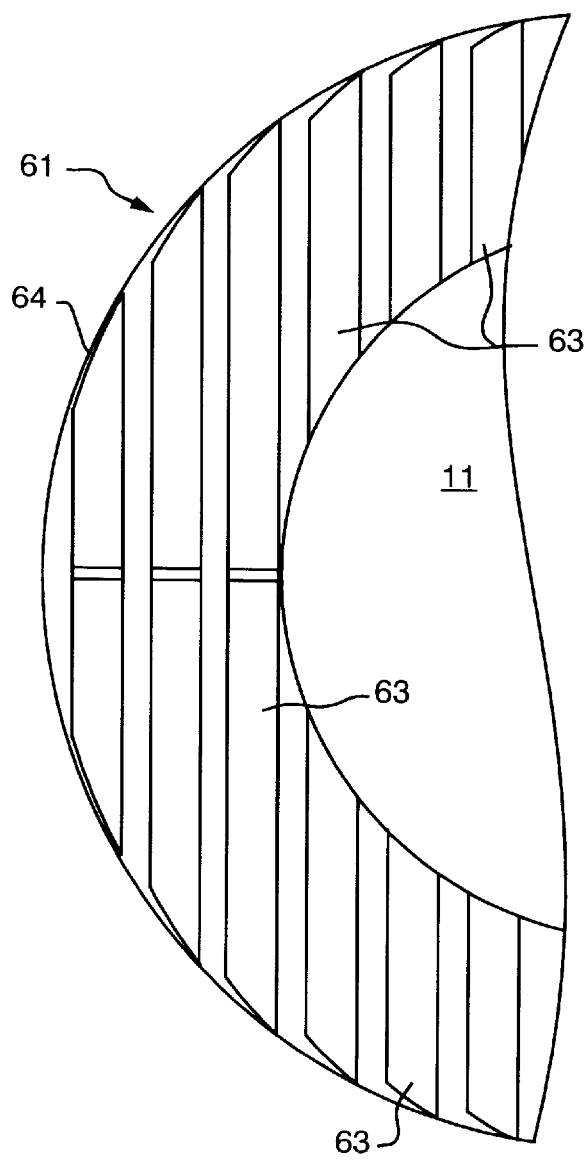
FIG. 6C is a partial, top plan view of the upper louver assembly in the closed position.
Figure 7A:
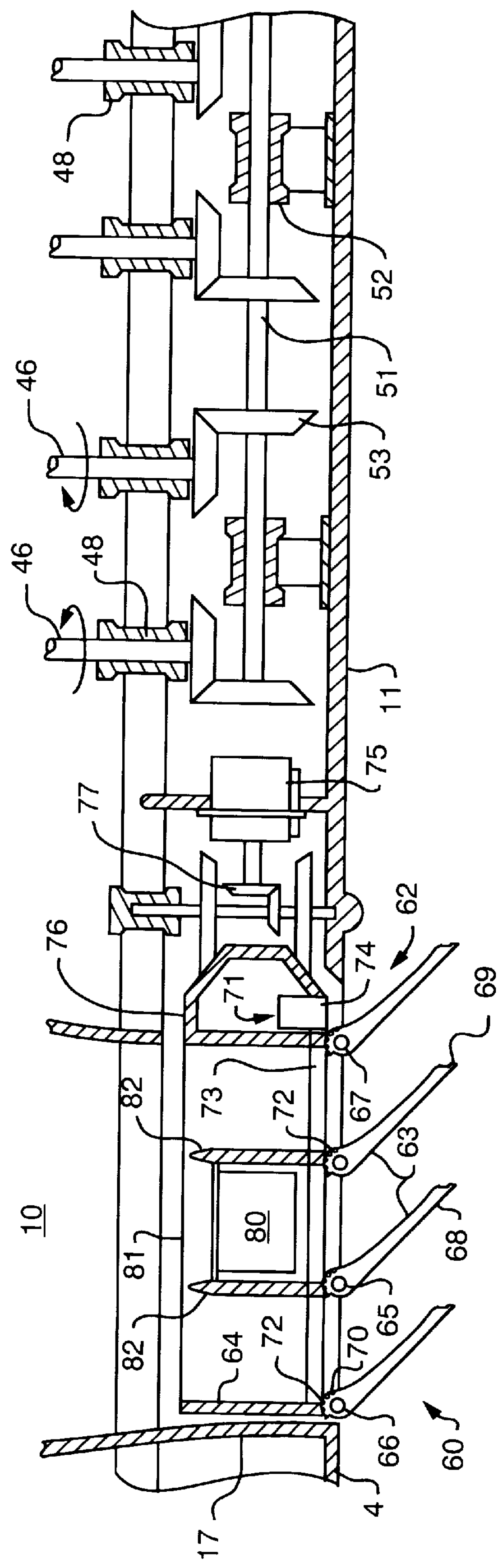
FIG. 7A is a cross-sectional view of the lower louver assembly of the annular thrust-flow channel, in an opened position.
Figure 7B:
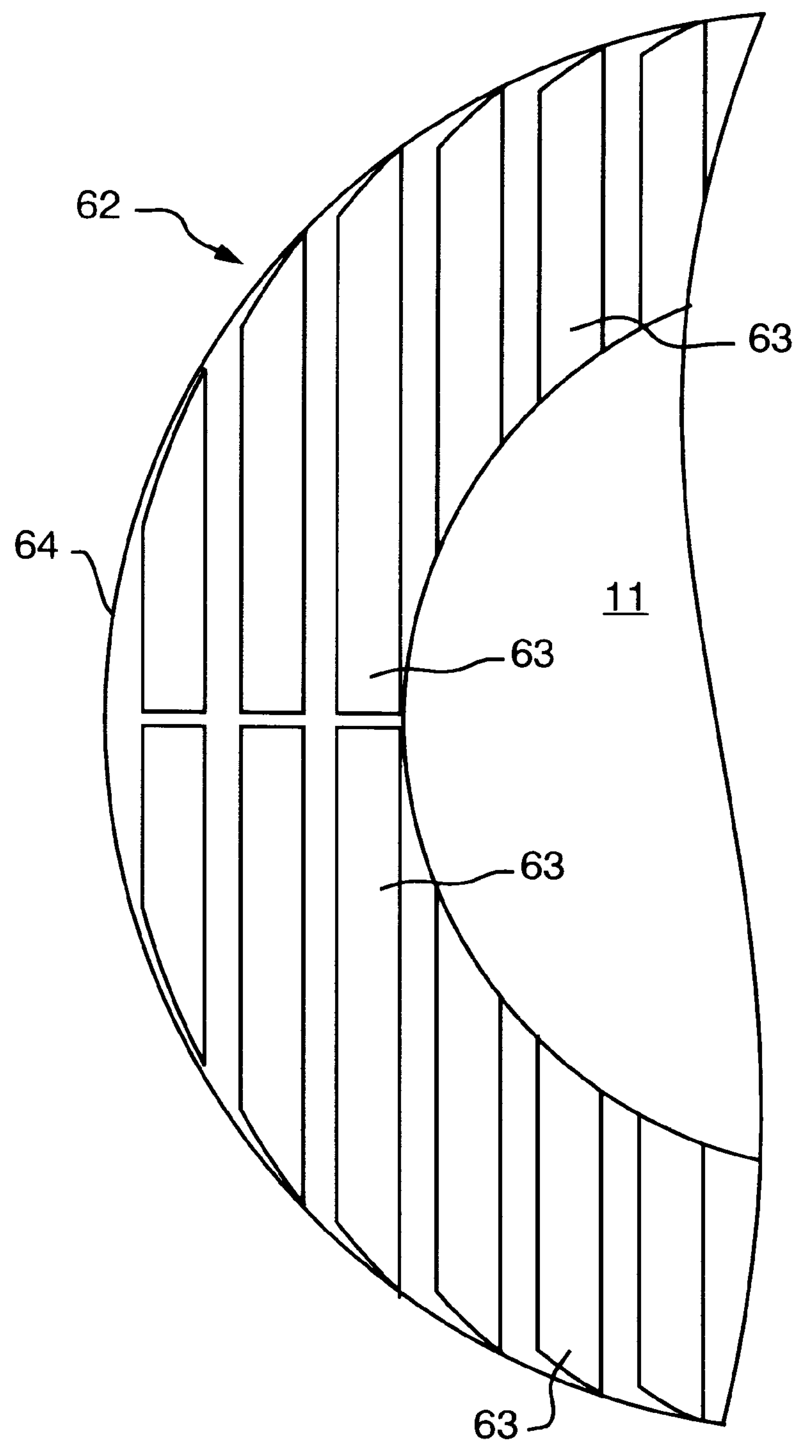
FIG. 7B is a bottom plan view of the lower louver assembly in a closed position.

The upper louver assembly 61 is positioned at the upper end of the annular thrust-flow channel 10, and generally includes a series of louvers 63 housed within a peripheral rim 64 to form a ring-shaped lattice (best shown in FIGS. 6C and 7B). Each of the louvers 63 extends through the upper louver assembly 61, and includes pins 65 at opposing ends for pivotally engaging the rim 64. The several louvers 63 are in this way pivotally received by the rim 64, in parallel, spaced relation to one another. The lateral edge 66 of each of the louvers 63 nearest to the pivot pins 65 includes an undercut 67 and the opposing lateral edge 68 of each of the louvers 63 includes an extended portion 69. When the louvers 63 are caused to assume a closed position, the extended portions 69 are caused to overlie the undercuts 67 to provide the outer face of the upper louver assembly 61 with the smooth configuration which is preferred.

Each of the louvers 63 is further provided with a bracket 70 capable of cooperating with a suitable drive mechanism 71 for moving the louvers 63 (in unison) between their opened and closed positions. To this end, each of the brackets 70 includes a series of teeth 72 capable of cooperating with a worm drive 73 extending through the louver system 61. A servo-motor 74 is provided for rotating the worm drive 73, in turn controlling the position assumed by the series of louvers 63.

The louver assembly 61 is also capable of rotation about the axis 21 of the annular thrust-flow channel 10. To this end, a servo-motor 75 is provided for engaging the hub 76 of the upper louver assembly 61 (much like the rims 30 of the blade wheels 25, 26) through an appropriate gear system 77. The orientation of the upper louver assembly 61 is preferably varied according to the direction of flight of the aircraft 1.

In forward horizontal flight, the individual rotor blades 28 of the uppermost blade wheel 25 located in the annular thrust-flow channel 10 are oriented edgewise relative to the developed airstream, which is an inefficient orientation for proper operation of the rotor system 20. In fact, since the flight speed may represent on the order of 30% to 40% of the mean linear speed of the blades of the rotor system, this could otherwise lead to a heavy imbalance in the thrust produced by the upper half of the rotor system 20 relative to its lower half. In conventional helicopters, this problem must be solved using a complex system of flapping hinges.

The aircraft 1 of the present invention avoids this problem by positioning the several louvers 63 of the upper louver assembly 61 (in forward flight) in such a way that incoming air (which outside of the aircraft 1 moves roughly parallel to its midplane) is deflected to enter the annular thrust-low channel 10 with a velocity which is generally parallel to the principal axis 22 of the aircraft 1 and having a magnitude which is more or less uniform over the entire uppermost annular cross-section of the channel 10. The blade wheels 25, 26, in cooperation with the vane wheels 27, may then operate properly (as previously described). While hovering, and in vertical flight (upward or downward), the individual louvers 63 are held vertically to allow the airflow to freely move into the annular thrust-flow channel 10 in a direction which is roughly parallel to the principal axis 22. In all cases, the upper louver assembly 61 of the present invention operates to maintain a substantially uniform flow of air into the annular thrust-flow channel 10.

The lower louver assembly 62 is positioned at the lower end of the annular thrust-flow channel 10, and includes many of the structural features of the upper louver assembly 61. For example, the lower louver assembly 62 again includes a series of louvers 63 housed within a peripheral rim 64 to form a lattice similar to that of the upper louver assembly 61. Each of the louvers 63 extends through the lower louver assembly 62, and includes pins 65 at opposing ends for pivotally engaging the rim 64. The several louvers 63 are in this way pivotally received by the rim 64, in parallel, spaced relation to one another. The lateral edges 66 of the louvers 63 nearest to the pivot pins 65 include an undercut 67 and the opposing lateral edges 68 of the louvers 63 includes an extended portion 69 so that when the louvers 63 are closed, the extended portions 69 are caused to overlie the undercuts 67 to provide the outer face of the lower louver assembly 62 with the smooth configuration which is preferred.

Each of the louvers 63 is again provided with a bracket 70 capable of cooperating with a suitable drive mechanism 71 for moving the louvers 63 (in unison) between their opened and closed positions. To this end, each of the brackets 70 includes a series of teeth 72 capable of cooperating with a worm drive 73 extending through the louver system 62. A servo-motor 74 is provided for rotating the worm drive 73, in turn controlling the position assumed by the series of louvers 63.

The louver assembly 62 is also capable of rotation about the axis 21 of the annular thrust-flow channel 10. To this end, a servo-motor 75 is provided for engaging the hub 76 of the lower louver assembly 62 (similar to the hub 76 of the upper louver assembly 61) through an appropriate gear system 77.

Rotations of the lower louver assembly 62 about the principal axis 22 of the aircraft 1 cause the air flow exiting from the annular thrust-flow channel 10 to be deflected in a direction opposite to the direction of flight. This produces the effect of a thrust vector (i.e., vector-thrusted propulsion) for moving the aircraft 1 in a desired direction.

For purposes of a finer flow control, the louvers 63 of the lower louver assembly 62 (and, if desired, the louvers 63 of the upper louver assembly 61) can be divided into symmetrical parts (along a diameter coincident with the roll axis). This is accomplished by separating the louvers 63 along the diameter of the lower louver assembly 62, and by providing a separate worm drive 73 and servo-motor 74 for each of the two separate half sections.

In forward flight, the separate (left and right) halves of the lower louver assembly 62 operate to deflect the air flow developed through the annular thrust-flow channel 10 in a synchronous way and as a single unit. The diametric separation between the two halves of the lower louver assembly 62 is oriented in the direction of flight (i.e., along the roll axis) and the louvers 63 combine to deflect the developed thrust (air) flow in a direction opposite to the direction of flight. To produce rotations of the aircraft 1 about the yaw or principal axis of symmetry, one half section of the (bottom) louvers 63 operates to deflect the thrust flow in a direction which differs from the direction of the thrust flow deflected by the other half section of the (bottom) louvers 63, producing a moment which causes the aircraft 1 to turn in a desired direction.

Side-to-side movement of the aircraft 1 can also be achieved using the above-described control systems. For a finer control of such movements, the lower louver assembly 62 can be provided with an additional series of air deflecting vanes 80, if desired. The vanes 80 are pivotally associated with the support structure 81 of the lower louver assembly 62, for example, between the vertical supports 82. The vanes 80 are generally orthogonal to the louvers 63 so that controlled deflection of the thrust flow using the louvers 63 and the vanes 80 can operate to move the aircraft 1 (e.g., while hovering) in controlled fashion in a horizontal plane extending through the aircraft 1 (i.e., forward, rearward, or to either side).

In operation, the lower louver assembly 62 combines with the bottom of the annular thrust-flow channel 10 to accomplish two purposes. First, the air flow discharged from the annular thrust-flow channel 10 is deflected in such a way that the resulting flow has both a downwardly directed component (for producing a lifting thrust) and a component parallel to the roll axis and having a direction opposite to the direction of flight (for producing a thrust in the direction of flight). Second, the air flow discharged from the annular thrust-flow channel 10 is able to closely follow the smooth bottom surface of the aircraft 1 so that this surface can closely resemble and aerodynamically behave like the bottom portion of an airfoil.

While hovering, both the upper louver assembly 61 and the lower louver assembly 62 allow the air flow to freely pass (uniformly) through the annular thrust-flow channel 10. As a result, the thrust which is produced (from the turbo-engines) is deflected in such a way that the total horizontal component of the forces acting on the aircraft 1 is zero. In this flight condition, control is provided mainly by the lower louver assembly 62. This control is very accurate due to the design of the aircraft 1 and its various components.

Deflecting the air flow exiting from the annular thrust-flow channel 10 in one direction causes the aircraft 1 to move in the opposite direction. Forward thrust depends on the speed of the air column discharged from the annular thrust-flow channel 10, and the angle of deflection. If desired, this forward impulse may be increased (supplemented) through the action (thrust) of the turbo-engines of the power plant 14.

As the flight speed increases, the airfoil shape of the aircraft 1 begins to produce an aerodynamic effect, developing lifting forces which increase with flight speed. When the forward speed of the aircraft 1 attains a threshold value (which will depend on the specific aerodynamic design of the fuselage of the aircraft), the lifting action of the rotor system 20 will no longer be necessary and operation of the rotor system 20 can be discontinued, if desired. In such case, the louvers 63 of the upper louver assembly 61 and the lower louver assembly 62 are moved to their closed positions so that the upper and lower surfaces of the fuselage 2 of the aircraft 1 behave like the upper and lower (smooth) surfaces of a conventional wing. Forward thrust is then produced solely by the turbo-engines. In this mode of operation, the aircraft 1 will perform much like a conventional airplane or, more precisely, like a flying wing. Lift is produced aerodynamically, by the airfoil-shaped fuselage 2 of the aircraft 1. As the forward speed of the aircraft 1 increases to the point where aerodynamic surfaces of the aircraft 1 can increasingly control the flight plane, the aircraft 1 is preferably controlled responsive to conventional flight control surfaces (i.e., rudder, flaps, ailerons, elevators, etc.) located mainly at its rearward end 7.

Decreases in flight speed will result in corresponding decreases in the lift produced by the aerodynamic surfaces of the aircraft 1. In such cases (to avoid a stall), or for purposes of causing the aircraft 1 to resume hovering, or to land, the foregoing operations may be reversed to re-establish lift using the rotor system 20. To accomplish this, the rotor system 20 is caused to rotate and the louvers 63 of the upper louver assembly 61 and the lower louver assembly 62 are opened to provide the aircraft 1 with an appropriate amount of lift, as previously described. Any such transitions between a flight mode, and a hovering/landing mode of operation, and vice versa, are smoothly and simply achieved to provide the pilot of the aircraft 1 with enhanced control.

FIGS. 8 to 10 show an aircraft 85 which is substantially similar to the aircraft 1 of FIGS. 1 and 2, incorporating a similar rotor system 20 for producing lift in low speed or hovering modes of operation. However, the aircraft 85 differs from the aircraft 1 in two significant respects. First, the shape of the aircraft 85 is changed from the shape of the aircraft 1 to better promote high speed flight. This includes a change of its aerodynamic shape, and the addition of surfaces (such as the winglets 86) for enhancing flight control. Second, the bottom part 15 of the central payload compartment 11 is configured to house the turbo-engines so that they project rearwardly, at 87, from the bottom of the aircraft 85. As the speed of the aircraft 85 progresses to the point where lift can be produced responsive to the aerodynamic shape of the fuselage, the rotor system 20 can be shut down and the louvers 63 of the upper louver assembly 61 and the lower louver assembly 62 can be closed, while the thrust for continued operation of the aircraft 85 is produced by the exposed rearwardly directed outlets 87 of the turbo-engines. The aircraft 1 of FIGS. 1 and 2 can be provided with a similar power plant, if desired.

It is also possible to use the rotor system 20 to produce thrust for moving the aircraft 85 (or the aircraft 1) forward, if desired. To this end, the annular thrust-flow channel 10 of the aircraft (either the aircraft 85 or the aircraft 1) would be modified to include a rearwardly directed outlet (e.g., an outlet 88 in place of one or more of the outlets 87 shown in FIG. 9). In this way, the downwardly directed air flow developed through the annular thrust-flow channel 10 can be converted to a rearwardly directed air flow, exiting from the outlet 88 and producing thrust for moving the aircraft forward. This may be used to supplement forward movement of the aircraft responsive to operations of the rotor system 20 (and the louver assemblies 61, 62) or responsive to the thrust produced (at 87) using the turbo-engines, or as the sole means for urging the aircraft forward (with the upper louver assembly 61 and the lower louver assembly 62 in their closed positions).

As a general matter, and for purposes of determining efficiencies, the amount of thrust available for producing lift can be approximated by the product of the volume of air that is being moved, multiplied by the speed of the air flow which is developed. This can limit efficiency for some of the higher speed applications since, during operations of the rotor system 20, a portion of the air which is being moved is drawn downwardly into the system. This limitation can in most cases be overcome by supplementing operations of the rotor system 20 with an additional (one or more) prime mover, such as the turbo-engines 87 of the aircraft 85 of FIGS. 8 to 10.

Figure 11:
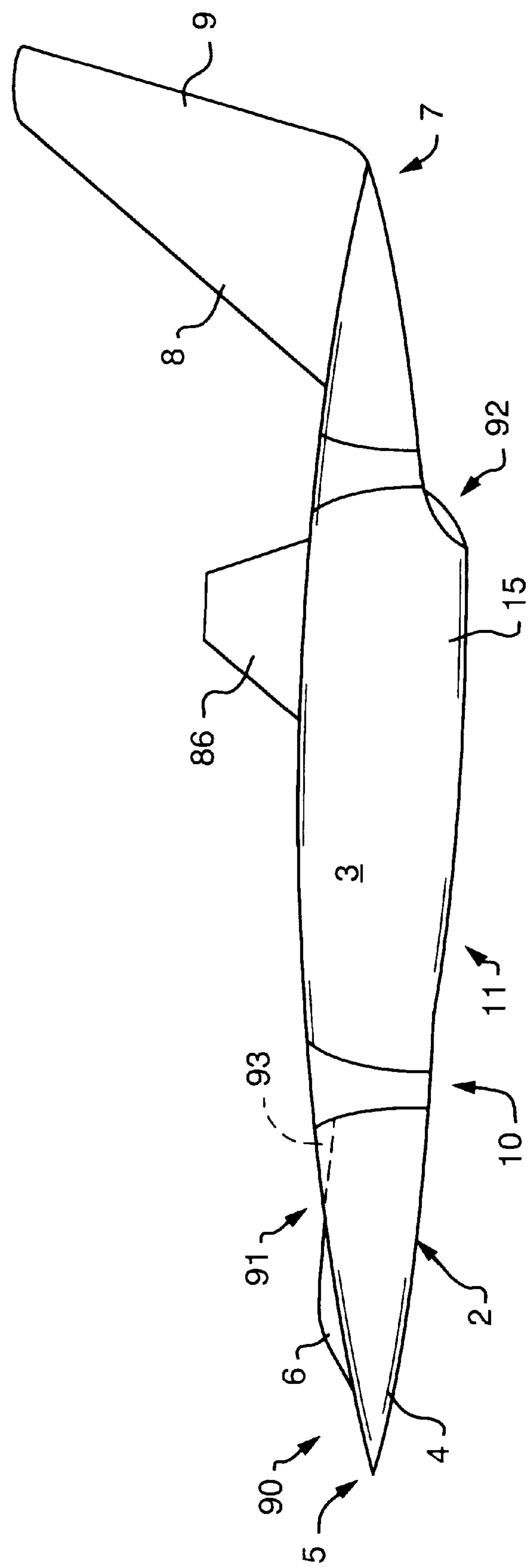
FIG. 11 is a partially sectioned, side elevational view of a second alternative embodiment aircraft produced in accordance with the present invention.

Still further improvements in efficiency can be achieved by modifying the aerodynamics associated with the central payload compartment 11, if desired. One such example of this is shown in FIG. 11. FIG. 11 illustrates an aircraft 90 having a configuration which substantially corresponds to that of the aircraft 85 of FIGS. 8 to 10. However, the aircraft 90 differs from the aircraft 85 by including an aerodynamically placed inlet 91 and outlet 92.

The inlet 91 is formed in an upper, forwardly directed portion of the fuselage 2, which may be varied (in size, shape and location) responsive to the overall shape of the fuselage 2. The inlet 91 is provided with a cover 93 which can be opened, to admit a flow of air into the annular thrust-flow channel 10, or closed, to complete the exterior covering 4 of the fuselage 2. The cover 93 can be opened and closed either responsive to pilot control, or in automated fashion, as desired. When opened, the inlet 91 operates to introduce air into the annular thrust-flow channel 10 while allowing the louvers 63 of the upper louver assembly 61 to remain closed. This, in turn, operates to supply a flow of air to the rotor system 20 while allowing the fuselage 2 to exhibit a smooth upper surface.

The outlet 92 is formed in a lower, rearwardly directed portion of the fuselage 2, and communicates with the plural outlets 87 of the turbo-engines (or the single outlet of a single turbo-engine). Alternatively, the outlet 92 can serve as a passive outlet 88 for communicating with the annular thrust-flow channel 10 as previously described. In either case, the outlet 92 can operate to apply thrust to the aircraft 90 while allowing the fuselage 2 to exhibit a smooth lower surface.

The outlet 91 may be used in conjunction with the outlet 92, as part of a single aircraft (as shown), if desired. Alternatively, the aircraft may be provided with either an inlet 91 or an outlet 92, depending on the application intended for the aircraft.

In cases where the aircraft is provided with an inlet 91, the overall height of the rotor assembly 20 (the blades 28) should preferably be less than the overall height of the annular thrust-flow channel 10. In this way, a space is preferably left at the top of the annular thrust-flow channel 10 (see FIG. 11) so that air entering the inlet 91 can then enter the channel 10 without encountering the blades 28 of the rotor system 20. This, in turn, allows the flow of air to be directed downwardly through the annular thrust-flow channel 10 before encountering the blades 28 of the rotor system 20, producing a more uniform (laminar) flow of air through the system, as is preferred. Similar benefits can be obtained by spacing the top of the rotor system 20 from the upper louver assembly 61 of an aircraft which does not include an inlet 91, if desired, to further ensure that an appropriate (uniform) flow of air is developed through the annular thrust-flow channel 10.

This also has the advantage of avoiding another problem commonly associated with the rotor systems of conventional helicopters, resulting from the differential in relative air speed which is developed at the tips of the rotors on the opposing sides of the aircraft (i.e., the air speed of the "advancing" rotor blades relative to the air speed of the "retreating" rotor blades on the opposite side). Leaving a space at the top of the rotor system 20 operates to arrange the air flow so that this air flow initially reaches the rotor system 20 (i.e., the first rotor plane) in an orientation which is more or less parallel to the central axis 21 of the annular thrust-flow channel 10, avoiding the problems associate with conventional helicopter rotor systems. Variations in blade pitch, as previously described, may be used to further improve flow through the annular thrust-flow channel 10, if desired.

Figure 12:
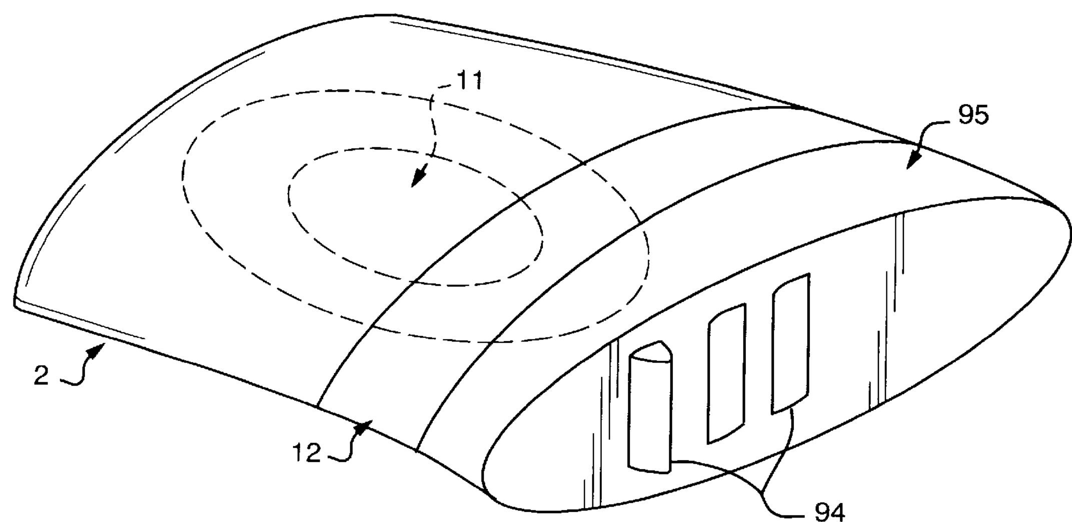
FIG. 12 is an isometric view of a third alternative embodiment aircraft produced in accordance with the present invention.

As a further alternative, the inlet (or inlets) for introducing air into the annular thrust-flow channel 10 may be positioned along the side (or sides) of the aircraft. This can be accomplished by providing the sides of either the aircraft 1, the aircraft 85, or the aircraft 90, with one or more doors (not shown) which communicate with the annular thrust-flow channel 10 much the same as does the inlet 91 shown in FIG. 11. This can also be accomplished by providing doors 94 in the opposing sides of an aircraft having the overall configuration of a flying wing, such as the aircraft 95 shown in FIG. 12. In such case, it is preferable to establish an overall height for the rotor system 20 (i.e., the blades 28) which is less than the overall height of the annular thrust-flow channel 10, to promote a uniform flow of air through the channel 10 as previously described. In any event, the doors 94 may be used in substitution for the upper louver assembly 61 (as shown in FIG. 12), leaving the aircraft 95 with a smooth (conventional) upper surface, or possibly as a substitute for the lower louver assembly 62 (leaving the aircraft 95 with a smooth lower surface) or as a supplement to these structures, as desired.

It is also possible to introduce air into the annular thrust-flow channel 10 from a rear inlet, as well as from the front and sides as previously described. Air may be drawn either exclusively from a single direction (from the front, the rear, or from either side), or from desired combinations (some or all) of these directions.

Figure 13:
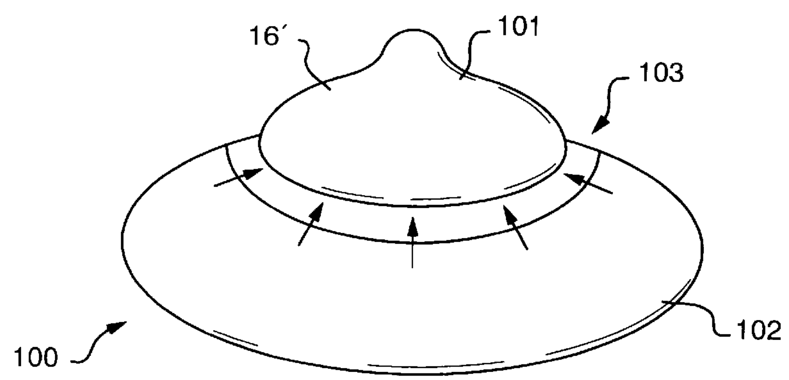
FIG. 13 is a schematic representation of a fourth alternative embodiment aircraft produced in accordance with the present invention.

As an example, the aircraft 100 of FIG. 13 is capable of drawing air from the front, from the rear, and from either side of the aircraft. The aircraft 100 includes a central payload compartment 101 which is no longer flush with the upper surface of the fuselage 102, but which instead projects upwardly from the fuselage 102. An annular inlet 103 is developed which extends fully around the central payload compartment 101, with the result that air can be drawn into the annular thrust-flow channel 10 from all directions. The modified central payload compartment 101 also provides an upper part 16' which is increased in size relative to the upper part 16 of the central payload compartment 11 previously described. While providing the aircraft 100 with an increased payload capacity, the extended upper part 16' of the central payload compartment 101 does tend to limit performance and for this reason is better suited to lower speed applications. The several aircraft 1, 85, 90, 95 can also be provided with extended upper portions, if desired, with corresponding limitations in the maximum flight speeds attainable by such aircraft.

Figure 14:
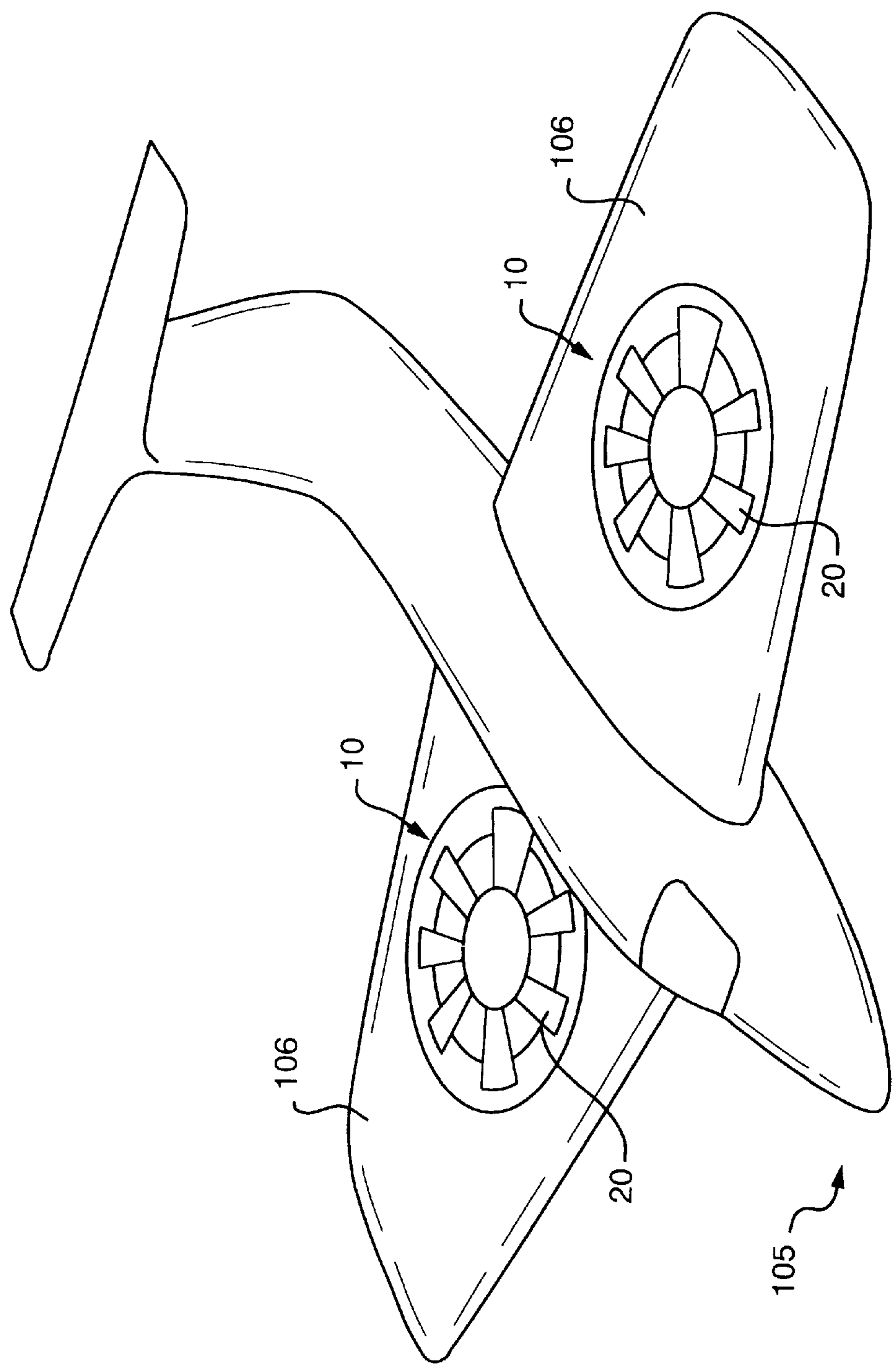
FIG. 14 is an isometric view of a fifth alternative embodiment aircraft produced in accordance with the present invention.

The improvements of the present invention may also be applied to the wings of a more conventional aircraft, such as the aircraft 105 shown in FIG. 14. In this embodiment, a plurality of annular thrust-flow channels 10 are associated with the wings 106 of the aircraft 105. A separate annular thrust-flow channel 10 is preferably formed in each of the wings 106, with each of the annular thrust-flow channels 10 being positioned along a longitudinal axis of the wing 106, primarily for purposes of balance. The blade wheels of the rotor systems 20 associated with the annular thrust-flow channels 10 are positioned to define a rotation axis which is generally perpendicular to the mid-plane of each wing 106.

The rotor systems 20 associated with the annular thrust-flow channels 10 again preferably include the paired, counter-rotating blade wheel assemblies previously described. However, the relatively flat cross-section of a conventional wing can in many cases leave a space (height) which is limited to the extent that each of the annular thrust-flow channels 10 will be able to accommodate only a single pair of counter-rotating blade wheels. It is even possible that in some cases, the height of the wing will only be sufficient to receive a single, rotating blade wheel. In order to prevent such an aircraft from spinning or precessing about its yaw axis, the single rotating blade wheel associated with one of the wings (e.g., the left wing) can be paired with a single rotating blade wheel associated with the opposing wing (i.e., the right wing), and the paired (single) blade wheels can be rotated in opposite directions to compensate for any rotational moments which might otherwise be produced.

Each of the annular thrust-flow channels 10 associated with the aircraft 105 includes a louver system (removed in FIG. 14 to reveal the rotor systems 20) corresponding to the louver system 60 previously described, for controlling the air flow developed by the rotor system 20. The annular thrust-flow channels 10 each operate to develop a column of air which is drawn from the upper side of the wing 106, and which is blown from the lower side of the wing 106. In this way, a low pressure region is created above each wing and a high pressure region is created below each wing, contributing to an increase in the lift normally produced by the wings 106 when the aircraft 105 is moving forward. The louver systems are also used to deflect the column of air flowing from each of the annular thrust-flow channels 10 in the direction which is desired to produce forward (or rearward) movement of the aircraft 105, and to direct the aircraft 105 to either side.

As previously described, air (intake) for the annular thrust-flow channels 10 can be drawn from the upper side of the wings 106, or from the front edge of the wings 106 in cases where it is desired to maintain a conventional, smooth upper surface for the wings 106 to increase their overall aerodynamic performance.

The combined action of the annular thrust-flow channels 10 and the aerodynamic forces developed by the wings 106 can be used to permit the aircraft 105 to fly at relatively low forward speeds, or to hover (provided sufficient power is transferred from the power plants associated with the annular thrust-flow channels 10). As the forward speed of the aircraft 105 is increased, the conventional lifting forces developed by the wings 106 will correspondingly (and smoothly) increase, eventually reaching the point where conventional forward flight of the aircraft 105 can be maintained solely responsive to the aerodynamic lift produced by the wings 106. At this point, further action of the annular thrust-flow channels 10 becomes unnecessary. If desired, operation of the rotor systems 20 (rotation of the blade wheels) can then be discontinued, and the louvers of the louver systems can be closed to provide the wings 106 with smooth upper and lower surfaces. The aircraft 105 can then perform as a conventional (winged) airplane, and in this mode, is capable of achieving significant forward speeds. All transitions from hovering, to slower forward speeds, to full forward flight, and conversely, are smooth and continuous.

Figure 15:
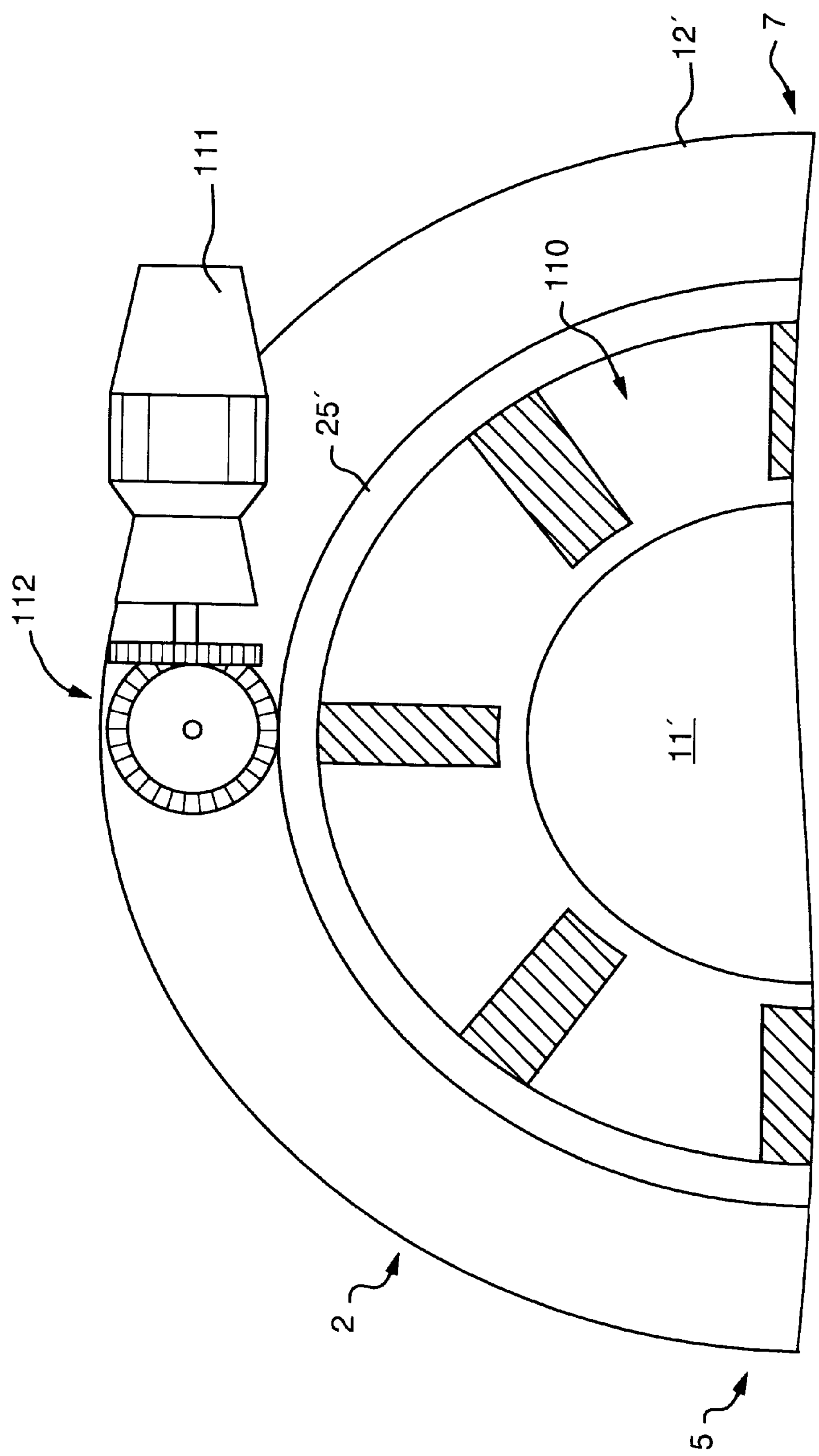
FIG. 15 is a partial, top plan view illustrating an alternative placement for the power plant used with the aircraft.

It is also possible to vary the manner in which the prime mover (i.e., the power plant) is associated with the rotor system it operates. For example, the several rotor systems 20 which have previously been described include prime movers which are in each case associated with the central payload compartment 11. FIG. 15 illustrates a rotor system 110 which is operated by a prime mover (i.e., the turbo-machine 111) associated with the peripheral payload compartment 12'. To this end, the prime mover 111 is provided with an appropriate, otherwise conventional drive mechanism (schematically represented by the drive gearing 112) for engaging peripheral (edge) portions of the blade wheels (shown at 25') associated with the rotor system 110. Such placement of the prime mover 111 has the advantage of leaving the central payload compartment 11' free for use, for example, to receive cargo or for passengers.

Figure 16A:
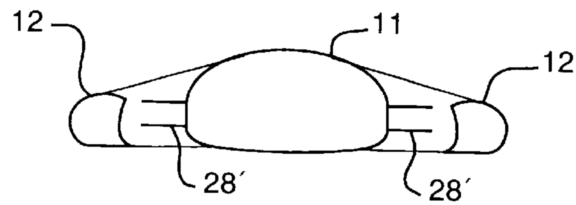
FIGS. 16A and 16B are schematic representations of a first alternative embodiment rotor system for use with the aircraft of the present invention.
Figure 16B:
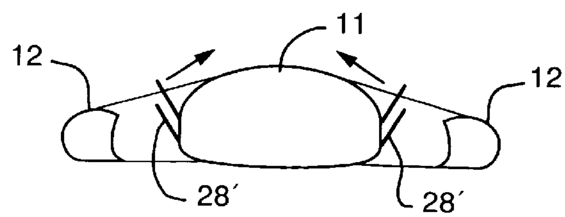
Figure 17A:
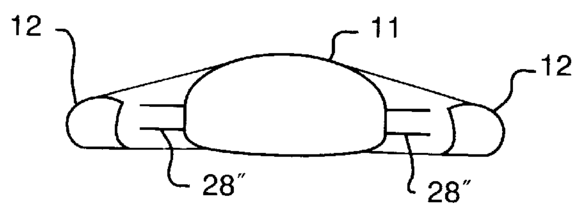
FIGS. 17A and 17B are schematic representations of a second alternative embodiment rotor system for use with the aircraft of the present invention.
Figure 17B:
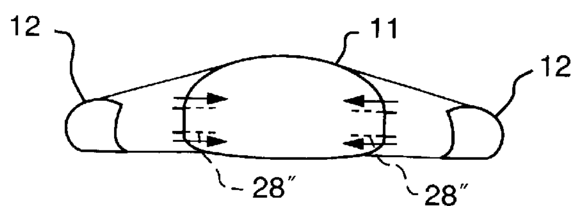

Yet other variations can be achieved by modifying the manner in which the blades are associated with the rotor system, if desired. For example, the rotor system 20 includes blades 28 which are capable of being varied in pitch. Referring to FIGS. 16A and 16B, it is also possible to provide a rotor system with blades 28' which are capable of assuming different elevations (angles) relative to the plane defined by the blade wheels which receive them. Referring to FIGS. 17A and 17B, it is also possible to provide a rotor system with blades 28" which are capable of being retracted from the annular thrust-flow channel 10, into the central payload compartment 11, in order to prevent damage to the blades. Combinations of these several blade movements are also possible.

In view of the foregoing, it will be understood that various changes in the details, materials and arrangement of parts which have been herein described and illustrated in order to explain the nature of this invention may be made by those skilled in the art within the principle and scope of the invention as expressed in the following claims.

What is claimed is:

1. An aircraft which provides hovering and forward flight, comprising:

an annular casing formed in the aircraft and defining an opening which extends through the aircraft;

a central compartment located within the opening formed in the aircraft, wherein the central compartment and the annular casing are spaced from each other to define an annular channel extending through the aircraft;

a rotor system located within the annular channel and including a pair of blade wheels associated with the central compartment, wherein each of the blade wheels has a plurality of blades extending from the blade wheels to a position adjacent to the annular casing, and a vane wheel associated with the central compartment and located between the pair of blade wheels, wherein the vane wheel has a plurality of vanes extending from the vane wheel to the annular casing; and means for rotating the blade wheels within the annular channel so that an air flow is developed through the annular channel which produces lift for the aircraft;

wherein the central compartment and the annular casing have side walls which define the annular channel, and wherein the side walls which define the annular channel have a configuration which narrows the annular channel in the direction of the air flow through the annular channel, thereby increasing the speed of the air flow through the annular channel while achieving air flow conditions through the annular channel which are substantially constant in pressure; and wherein the pair of blade wheels are vertically aligned, the blades extending from the blade wheels have a length, and the length of the blades extending from a first one of the blade wheels is greater than the length of the blades extending from a second one of the blade wheels which is located beneath the first one of the blade wheels.

2. The aircraft of claim 1 which further includes a fuselage including an interior space surrounded by an exterior covering for developing aerodynamic lift responsive to forward movement of the aircraft.

3. The aircraft of claim 2 wherein the annular casing combines with the exterior covering to enclose the interior space and define the opening which extends through the aircraft.

4. The aircraft of claim 3 wherein the opening extends through the fuselage of the aircraft.

5. The aircraft of claim 3 which further includes wing portions associated with the fuselage, and wherein the opening extends through the wing portions of the aircraft.

6. The aircraft of claim 5 wherein the fuselage includes a pair of wings, and wherein each wing includes an opening extending through the wing.

7. The aircraft of claim 2 wherein the central compartment further includes an interior space.

8. The aircraft of claim 1 which further includes control surfaces for directing movements of the aircraft.

9. The aircraft of claim 1 wherein a plurality of struts extend between and interconnect the central compartment and the annular casing.

10. The aircraft of claim 1 wherein the pair of blade wheels are rotated in opposite directions to prevent spinning and precession of the aircraft.

11. The aircraft of claim 10 wherein the rotor system includes a plurality of paired blade wheels, positioned in series combination.

12. The aircraft of claim 1 wherein each of the blade wheels includes an annular rim associated with the central compartment, and a plurality of blades mounted to the annular rim and extending from the annular rim toward the annular casing.

13. The aircraft of claim 12 wherein the blades have a length and the blade wheels have a radius, and wherein the length of the blades is no more than one-half of the radius of the blade wheels.

14. The aircraft of claim 13 wherein the length of the blades is no more than one-third of the radius of the blade wheels.

15. The aircraft of claim 12 wherein the blades are movably associated with the annular rim.

16. The aircraft of claim 15 wherein the blades are received by a shaft extending from the annular rim, and wherein the blades are rotatable about an axis defined by the shaft.

17. The aircraft of claim 15 wherein the annular rim defines a plane, and wherein the blades are movable in elevation relative to the plane defined by the annular rim.

18. The aircraft of claim 15 wherein the blades are retractable within the annular rim.

19. The aircraft of claim 12 wherein each of the blade wheels is engaged by an opposing pair of bearing wheels so that each of the blade wheels is maintained in a plane defined by the annular rim and so that each of the blade wheels is rotatable about an axis perpendicular to the defined plane.

20. The aircraft of claim 19 wherein the blade wheels are mechanically coupled with a prime mover for rotating the blade wheels.

21. The aircraft of claim 20 wherein the bearing wheels and the prime mover are coupled by a fixed drive shaft.

22. The aircraft of claim 20 wherein the prime mover is associated with the central compartment.

23. The aircraft of claim 20 wherein the prime mover is associated with the annular casing.

24. The aircraft of claim 19 wherein the blade wheels are electromagnetically coupled with a prime mover for rotating the blade wheels.

25. The aircraft of claim 24 wherein the annular rim forms a rotor of a linear motor having a stator which is electrically coupled with the prime mover.

26. The aircraft of claim 24 wherein the prime mover is associated with the central compartment.

27. The aircraft of claim 24 wherein the prime mover is associated with the annular casing.

28. The aircraft of claim 1 wherein the vane wheel includes an annular rim associated with the central compartment, and a plurality of vanes mounted to the annular rim and extending between the annular rim and the annular casing.

29. The aircraft of claim 28 wherein the vanes are movably associated with the annular rim.

30. The aircraft of claim 29 wherein the vanes are received by a shaft extending from the annular rim, and wherein the vanes are rotatable about an axis defined by the shaft.

31. The aircraft of claim 1 which further includes a prime mover associated with the central compartment, for operating the rotor system.

32. The aircraft of claim 31 wherein the prime mover is directly coupled only with the rotor system.

33. The aircraft of claim 31 wherein the prime mover is directly coupled with the rotor system, for operation of the rotor system, and includes portions extending from the aircraft, for producing a thrust in addition to operation of the rotor system.

34. The aircraft of claim 33 wherein the prime mover is a turbo-machine which is coupled with the rotor system and which includes a nozzle portion extending from the central compartment to produce an additional thrust for moving the aircraft.

35. The aircraft of claim 33 wherein the prime mover is a nozzle which is coupled with the annular channel and which extends from the central compartment to produce an additional thrust for moving the aircraft.

36. The aircraft of claim 1 which further includes means for controlling air flowing through the annular channel.

37. The aircraft of claim 36 wherein the controlling means includes a plurality of louvers at a first end of the annular channel, and wherein the louvers are movable between an opened position for passing air into the annular channel and a closed position for enclosing the annular channel.

38. The aircraft of claim 37 wherein the louvers are received in a peripheral rim so that the louvers can be moved between the opened position and the closed position.

39. The aircraft of claim 38 wherein the louvers are moved between the opened position and the closed position in unison.

40. The aircraft of claim 38 wherein the peripheral rim is rotatable about an axis defined by the central compartment.

41. The aircraft of claim 37 wherein the louvers have edges which cooperate to develop smooth and continuous surfaces extending between adjacent louvers in the closed position.

42. The aircraft of claim 37 wherein the controlling means further includes a plurality of louvers at a second end of the annular channel opposite to the first end, and wherein the louvers at the second end of the annular channel are movable between an opened position for passing air from the annular channel and a closed position for enclosing the annular channel.

43. The aircraft of claim 42 wherein the louvers are received in a peripheral rim so that the louvers can be moved between the opened position and the closed position.

44. The aircraft of claim 43 wherein the louvers are moved between the opened position and the closed position in unison.

45. The aircraft of claim 43 wherein the peripheral rim is rotatable about an axis defined by the central compartment.

46. The aircraft of claim 43 wherein the louvers are split into two half sections which are separately movable between the opened and the closed position.

47. The aircraft of claim 43 which further includes a plurality of vanes associated with the louvers at the second end of the annular channel.

48. The aircraft of claim 47 wherein the louvers at the second end of the annular channel cooperate with the vanes to pass air from the annular channel in separate, orthogonal directions.

49. The aircraft of claim 43 wherein the louvers have edges which cooperate to develop smooth and continuous surfaces extending between adjacent louvers in the closed position.

50. The aircraft of claim 37 wherein the controlling means further includes a plurality of louvers positioned at side edge portions of the aircraft, wherein the louvers are in communication with a second end of the annular channel opposite to the first end, and wherein the louvers at the second end of the annular channel are movable between an opened position for passing air from the annular channel and a closed position for enclosing the annular channel.

51. The aircraft of claim 36 wherein the controlling means includes a cover at a first end of the annular channel, wherein the cover is movable between an opened position for passing air into the annular channel and a closed position for enclosing the annular channel.

52. The aircraft of claim 51 wherein the cover is associated with upper portions of the aircraft, for introducing the air from the upper portions of the aircraft.

53. The aircraft of claim 51 wherein the cover is associated with leading edge portions of the aircraft, for introducing the air from forward portions of the aircraft.

54. The aircraft of claim 1 wherein the annular channel has the configuration of a narrowing venturi.

55. The aircraft of claim 54 wherein the side walls have a straight shape with a varying slope, thereby developing the narrowing venturi which increases the speed of the air flow through the annular channel.

56. The aircraft of claim 54 wherein the side walls have a curved shape with a varying curvature, thereby developing the narrowing venturi which increases the speed of the air flow through the annular channel.

57. The aircraft of claim 54 wherein the annular channel is narrowed in a ratio on the order of 2:1.

58. The aircraft of claim 54 wherein the annular channel is narrowed in a ratio on the order of from 3:1 to 4:1.

* * * * *